March 18, 1969 R. D. BROUSSEAU ET AL 3,434,149

METHOD AND RECORDER FOR MAKING TIME STUDIES

Filed Aug. 8, 1966 Sheet 1 of 7

INVENTORS
ROY D. BROUSSEAU
CARL W. KOGSTROM
BY
Barnes, Kisselle, Raisch & Choate
ATTORNEYS INVENTORS
ROY D. BROUSSEAU
CARL W. KOGSTROM
BY
Barnes, Kisselle, Raisch & Choate
ATTORNEYS INVENTORS
ROY D. BROUSSEAU
CARL W. KOGSTROM
BY
Barnes, Kisselle, Raisch & Choate
ATTORNEYS INVENTORS
ROY D. BROUSSEAU
CARL W. KOGSTROM
BY
Barnes, Kisselle, Raisch & Choate
ATTORNEYS

METHOD AND RECORDER FOR MAKING TIME STUDIES

INVENTORS
ROY D. BROUSSEAU
CARL W. KOGSTROM
BY
Barnes, Kisselle, Raisch & Choate
ATTORNEYS

METHOD AND RECORDER FOR MAKING TIME STUDIES

INVENTORS
ROY D. BROUSSEAU
CARL W. KOGSTROM
BY
Barnes, Kisselle, Raisch & Choate
ATTORNEYS INVENTORS
ROY D. BROUSSEAU
CARL W. KOGSTROM
BY
Barnes, Kisselle, Raisch & Choate
ATTORNEYS

United States Patent Office 3,434,149

Patented Mar. 18, 1969

3,434,149
METHOD AND RECORDER FOR MAKING TIME STUDIES

Roy D. Brousseau, 11313 Charest, Detroit, Mich. 48212, and Carl W. Kogstrom, Detroit, Mich.; said Kogstrom, assignor to said Brousseau Filed Aug. 8, 1966, Ser. No. 570,919

U.S. Cl. 346—1 23 Claims

Int. Cl. G01d 15/08

ABSTRACT OF THE DISCLOSURE

A portable machine for recording time study data in which a turntable is rotatably mounted in a housing to removably support a circular electro-sensitive chart for co-axial rotation therewith. A motor and drive mechanism rotates the turntable about its axis at a pre-determined speed and also, through a lead screw drive take off, propels a recording head along a recording arm which extends over the turntable generally radially thereof and parallel to the chart surface. The recording head carries a plurality of electro-discharge styli which are individually connected to charged capacitors by manually operating, selectively and/or simultaneously push button switches disposed in a keyboard array. Each switch completes a circuit connection between one or more of the styli and the chart on the table to thereby generate an electrostatic capacitive discharge which burns a dot on the recording chart decodable into measured time periods by the positional relationship of the styli and dots relative to chart indicia or read-off instruments.

A pace simulating mechanism is also provided which includes a pointer manually movable through a fixed arc corresponding to the end limits of an observable movement of a worker. The swinging motion of the pointer from one end limit to the other end limit actuates spaced switches in the path of pointer movement which are connected to styli in the recording head to make a dot recording indicative of the time span of an intermediate portion of the movement of the worker and thereby accurately determine the pace or tempo at which the worker is moving.

This invention relates to method and apparatus for making time studies.

Modern time study can be considered as having two phases. The first phase is the actual measurement and recording of the time it takes to do every step of an operation. This includes the operator's movements and the various functions of his machine. Usually, exhaustive recordings are made until the time study observer feels that he has enough data to give him a truly representative average time to do each part of the job. Allowances are made for worker fatigue, unavoidable delays, and other shop conditions.

The second phase involves classifying and organizing the facts obtained into usable statistics. Whenever manual motion contributes to the accomplishment of a job, the observer relies on his experience to judge the worker's pace. Then he applies a formula to adjust his recorded figures, compensating for any deviation from a pace that has been accepted by both labor and management—usually through long work standards negotiations. In their final form, these statistics are called "Standard Data" by industrial engineers.

Since these statistics compiled in the form of standard data tell the time it takes to do each step—or "element"—of a production operation, a time study engineer can use them as building blocks to arrive at the time it should take to do any new operation that consists of individual elements for which standard data has been established. In effect, a standard data time study is a composite of possibly hundreds of time studies, with all the elements extracted and regrouped.

It is often considered more advantageous to establish work standards from standard data than to cover them completely with individual time studies for each machine, each operation, each different part. In addition to being more economical, this method provides a reasonably equitable uniformity of work standards between various jobs, machines and departments. Numerous other manufacturing functions, including systems of wage payment, scheduling, cost estimating, incentive plans, determinations of departmental efficiency and even expenditures for tooling, are also dependent on precise time studies.

But shortcomings in present time study equipment and methods give rise to some rather serious problems. The time study observer not only has to watch the worker's actions carefully—he must also glance quickly at the moving hand of his stop watch and pencil in his reading on a clip board form when the worker completes each step of the operation. Graduations on the dials of most time study stop watches are closely spaced and read in fractions—and the hand sweeps by them at a speed of about an eighth of an inch a second. At best, the observer can read time only to the nearest hundredth of a minute—an extremely coarse unit for precise time study purposes—with no hope of making the next reading in less than three or four hundredths of a minute later. This imposes a minimum limit of between two and three full seconds between readings.

If the steps come in rapid-fire succession, as often occurs with efficient production machinery, the observer is left with no choice—he must group all back-to-back short duration steps and treat them as one element for recording purposes. Then, if the recorded time for a grouped element is excessive, the industrial engineer is left in a quandary. He does not know which step in the group is causing trouble and needs his attention.

Despite intensive training efforts and evaluating sessions by most companies, some rather serious errors find their way into the process of rating a worker's performance. Individual time study observers have no objective criteria on data on which to base their ratings, or comparisons with the accepted work standards. Through training and experience, they must arbitrarily judge each worker's pace—rate it as a certain percentage of normal. And even if all time study observers have a uniform concept of the normal pace—which is practically never the case—their ratings of a given worker's pace will vary by as much as fifteen percent. This condition, which both management and labor have had to live with, has prompted strikes and walkouts over production standards that have cost industry millions of dollars' worth of time and money. And workers have suffered correspondingly.

In view of the problems involved with present day time study equipment and methods, there is a need for a specialized portable time recording instrument which allows a time study observer to make an instant and permanent record of job elements in terms of split-second time intervals as the job is being performed, and for a method and means of accurately rating a worker's pace.

Objects of the invention

An object of the present invention is to provide an "Events Recorder" or time study machine adapted to meet the aforementioned need for increased recording accuracy and greater refinement of elements in time study operations by enabling a time study observer to record successive short-duration elements to the nearest one-thousandth of a minute, thereby greatly reducing or eliminating the inherent errors and inconsistencies resulting from reading a stop watch which in turn carry over to the standard data formulation and then compound and integrate into standard data programs. Thus the invention makes it possible to eliminate the common and undesirable practice of time study engineers wherein short duration elements are combined to approximate reasonable accuracy.

A more specific object of the present invention is to provide a lightweight and completely portable time study machine energized by a self-contained power supply and capable of making an accurate, permanent record of time sequence and duration of time study elements on a rotating disc. The discs are made of electro-sensitive paper into which pinpoint dots are instantaneously formed by condenser discharge through a plurality of styli when the operator depresses any one of a corresponding number of keys individually coded to an associated stylus. In the disclosed embodiment, each disc will provide up to 30 minutes of recording time, the recording time being variable by a selection of turntable speeds from ¼ through 4 revolutions per minute.

The present invention also provides a time study machine capable of recording numerous job elements by using different combinations of manually operated keys, and each of the keys can be associated by number or other code symbol with an individual element. As each job element is completed, this event can be permanently recorded merely by depressing a numbered key. More elements can be recorded than there are keys merely by the operator depressing the number "two" key for the next element, etc. The number "one" key would be reserved to indicate the start of a new cycle. This technique makes it possible to take a time study with numerous job elements. Foreign and special elements can be identified by depressing two keys simultaneously.

Another object is to provide a time study machine of the above character which permits time studies to be taken while employing the same basic principles involved in the present stop watch application, but which will provide elemental refinement with a much higher ultimate precision whereby individual elements of .01 minute in duration can be recorded.

Another object of the invention is to provide an improved method of measuring what is known in the art as "factor X," and to provide a manually operated device, herein termed a "pace simulator," either alone or in combination with the event recording apparatus of the invention, which provides an efficient and easily operated motion time study tool for the measurement of "factor X" or, in other words, of the worker's pace in those situations where repetitive motion produces accomplishment. The pace simulator allows the time study engineer to follow a worker's tempo, deriving a tangible factor for normal pace comparsion. Standard data derived from the pace-simulator method and apparatus of the invention is precise, refined and equitable since it will not be vulnerable to different operators' varying concepts of normal time. The pace simulator need not be used for the full duration of a time study, but only when circumstances warrant its use for motion measurement.

Summary of the invention

The present invention comprises a recorder adapted to make an accurate and permanent record of time intervals on a circular chart. Unusally these time intervals correspond to the initiation and termination of individual events in a particular job or task which are registered in sequence on the chart from an electrodischarge recording head which is contorlled by an operator-actuated keyboard or automatically.

In the preferred embodiment disclosed herein the recorder is completely portable, containing its own power supply. It will record and plot the time, sequence, and duration of nine separate time events or elements on a single circular chart through periods of up to thirty minutes. An unlimited number of plotting channels may be obtained by using various combinations of the nine channels. The recording is made on an electrosensitive chart paper requiring only a small amount of electrical energy to record a permanent mark on the surface. This electrical impulse is triggered at the keyboard or remotely, and through a condenser discharge circuit is conducted to the electrosensitive paper by a wire stylus. There are nine such styli in contact with the chart at all times. The independent or combined energizing of these styli may be controlled by a "touch system" of finger operation of single and combined push buttons or keys of a keyboard, containing for example nine keys mounted on the top of the recording machine, each key of which controls the energizing of its corresponding stylus and therefore its particular recording channel. This feature permits a very large number (44 in the case of a nine channel system) of separate events in one particular sequence to be recorded, since a mark on channel one, the first channel, may be used to indicate the start only of a sequential time recording. When a new cycle is required the operator pushes the channel one key again to denote a new cycle of recording.

The recording mechanism of the invention as illustrated by way of a preferred example herein consists of three major parts: a turntable, a recording arm assembly, and a recording head.

The turntable consists of a flat circular electrically conductive disc mounted on a central spindle for rotation about a vertical axis. A circular piece of chart paper having a center aperture is located centrally on the table by this spindle and is held securely by a magnetically clamped driving cap. The turntable is driven at a constant speed by a battery operated governed D.C. motor and speed reducer. Speeds of ¼, ½ 1, 2 and 4 r.p.m. of the turntable are selectively obtained by means of a five-speed transmission. This offers the operator a choice of chart economy or extreme accuracy.

The recording arm assembly is composed of a base, swivel mounted at turntable level, and two parallel arms which extend from the base and overhang the turntable. One arm is a guide bar, the other a lead screw. The arms carry and threadably propel the recording head and its styli parallel to and radially of the turntable and at a constant speed relative to the speed of the turntable. The recording head, carrying the styli, is driven by the lead screw via a half nut and rides on the guide bar to radially traverse the chart paper. The lead screw is driven from the turntable by a chain drive through the base of the arm assembly. Thus, the head and styli are moved in synchronism with the turntable toward the center of the turntable and thereby generate a spiral of constant pitch over the chart paper. The recording arm assembly can be pivoted about the tiltable axis of the base for movement clear of the table to facilitate chart loading. A detent is provided to locate and hold the arm assembly when returned to operating position.

The invention also comprises a pace simulator device comprising a swivel mounted arm or pointer which is manually movable through an arc as determined by end stops to track repetitive body movements of a worker performing a repetitive task and thereby simulate the worker's motion. Switch contacts are associated with the arm and are actuated by movement of the arm through a central portion of the arc corresponding to the period of relatively constant motion, as distinguished from the acceleration and deceleration periods at the opposite ends of the arc. The contacts are connected in circuit with a stylus of the recording head of the recording machine to provide a graphic readout on the chart paper of the period of relatively constant motion of the movement being tracked.

Detailed description of the invention

Additional objects, features and advantages of the present invention will become apparent from the following detailed description taken in conjunction with the accompanying drawings wherein.

General arrangement of events recorder

Figure 1:
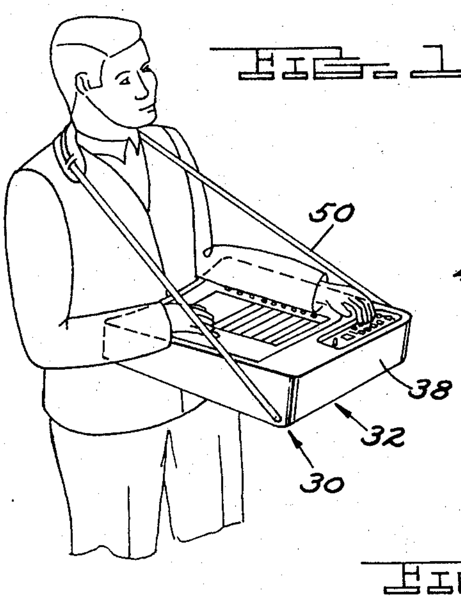
FIG. 1 is a perspective view illustrating a portable time study machine of the present invention supported by carrying straps against the body of a time study operator.
Figure 2:
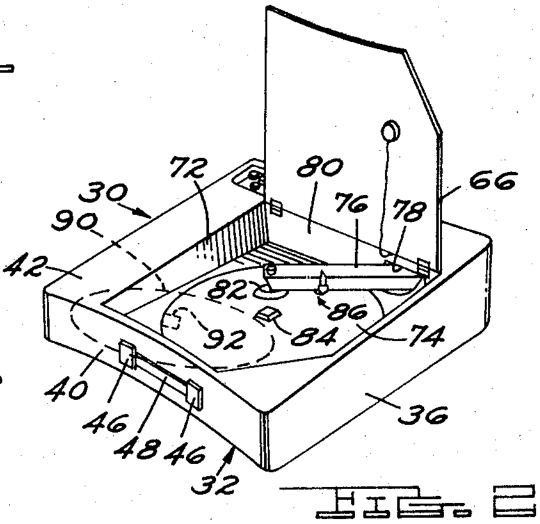
FIG. 2 is a perspective view of the time study machine as viewed from the right hand rear corner with the lid in raised position for access to the turntable as when inserting or removing chart paper.
Figure 3:
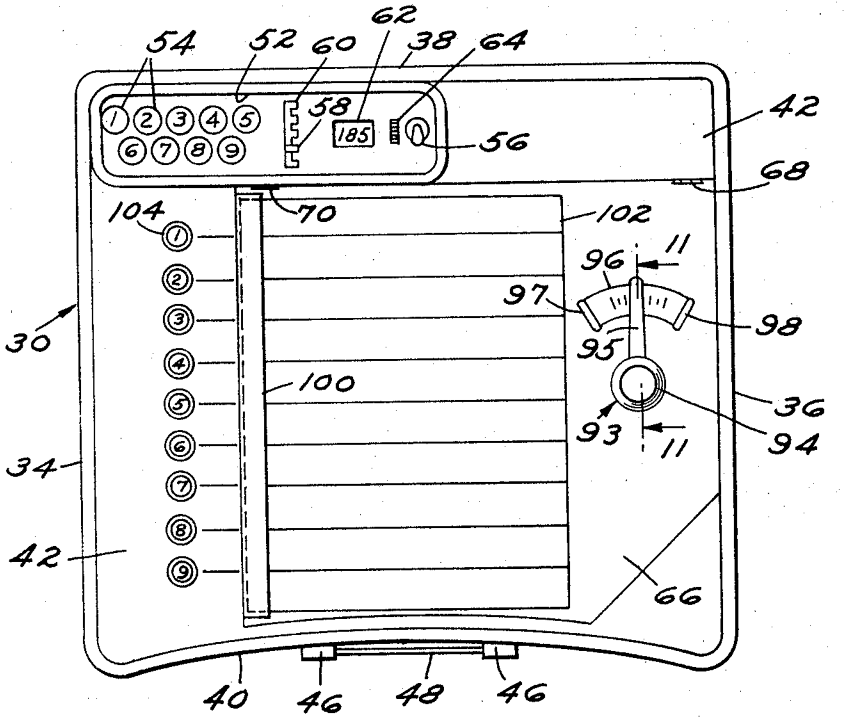
FIG. 3 is a top plan view of the time study machine with the lid lowered to its closed position.

Referring to FIGS. 1, 2 and 3, the events recorder or time study machine 30 of the present invention is enclosed in a generally rectangular case 32, preferably dimensioned on the order of 14″ by 13″ by 4″ and formed of plastic or other suitable semi-rigid material. Case 32 comprises parallel side walls 34 and 36, a straight front wall 38 and a rear wall 40 which is gently curved to abut and conform comfortably with the waist of a time study observer as illustrated in FIG. 1. A top wall 42 of the case is inclined downwardly from front to rear of the case relative to the flat normally horizontally disposed bottom wall 44 (FIG. 5) of the case.

A pair f spaced belt clips 46 are centrally secured to rear wall 40 and a hand strap 48 is secured at its opposite ends to clips 46. Clips 46, together with a padded leather neck strap 50 (FIG. 1) which clips to suitable eyes near the front of sides 34, 36 of the case, are adapted to support recorder 30 in a comfortable, level, waist-high position that is convenient for use by the observer when he is in a standing position with his left elbow resting on the top wall of the case.

A pair of spaced belt clips 46 are centrally secured to upper left hand portion of top wall 42 to house most of the operating controls; nine keys 54 arranged in two staggered rows, an "on-off" switch 56 and a gear shift 58 which permits the operator to select one of five recording speeds by shifting the lever to one of the five notches 60 in a notched opening in the bottom of cavity 52. Cavity 52 also houses the indicating dial of a conventional counter 62 which is mechanically or electrically actuated by operation of key number 1 of keys 54 to indicate to the operator a running total of the number of operation cycles recorded. A knurled dial 64 is disposed between switch 56 and the counter for resetting the same to zero.

A major portion of top wall 42 of the case is made up of a lid 66 hinged at 68 and 70 along its upper edge to swing up and away from the operator (FIG. 2) to provide access to the recording compartment 72 of the case which contains a smooth metal turntable 74 approximately 10″ in diameter. A recording arm 76, secured at its inner end to a pivot support housed within the case, extends through an opening 78 in the front wall 80 of compartment 72 out over turntable 74. The outer end of arm 76 carries a magnetic clamping disc 82 adapted to overlie a square pedestal 84 centrally affixed to turntable 74. Arm 76 guides and propels a recording head 86 (shown and described in more detail hereinafter in conjunction with FIGS. 7, 8, 9 and 10) for movement radially inwardly over the upper surface of turntable 74. Head 86 carries nine styli 88 (FIGS. 7, 9 and 10) which consists of closely spaced wires cantilevered at one end from the head and terminating in downwardly pointing ends which are adapted to lightly contact a chart disc 90 (FIGS. 2 and 9) mounted on turntable 74. Disc 90 is circular in form with a square hole 92 at its center adapted to receive pedestal 84 to locate and drive the chart on the table. The chart disc is made of conventional electrosensitive three-layered paper-like material consisting of a top layer made up of a thin coating of a white, low resistance material, an intermediate layer of black carbon filler and a bottom layer consisting of a conductive aluminized coating.

To make a recording of the time elements, arm 76 is raised slightly to be clear of pedestal 84 and a blank chart 90 is slipped onto turntable 74 as illustrated in FIG. 2. Aperture 92 of the disc is registered with pedestal 84 and then disc 82 is lowered onto chart 90 to magnetically clamp the same flat on the turntable. As the chart is rotated by the turntable, recording head 86 moves slowly inwardly from the outer rim of the chart. The result of these two motions is that the recording head describes an inward-curving spiral over the surface of the chart. When one of the nine push buttons 54 is manually depressed, a small burst of electrical energy is flashed to the corresponding stylus 88, thereby instantly etching a dot through the top coating of chart 90. When the recording is completed, the outer end of the recording arm 76 is lifted off the turntable, thereby releasing chart 90 for removal and replacement with a fresh chart.

Referring to FIG. 3, the pace simulator 93 of the invention is preferably combined with the time study machine 30 and comprises a small knob 94 (FIG. 3) journalled on lid 66 adjacent the right hand edge thereof, and a pointer 95 which extends radially from knob 94 away from the operator. Pointer 95 extends parallel to lid 66 and beneath an arcuate transparent scale plate 96 which is supported at its opposite ends on stops 97 and 98 which define the end limits of angular travel of pointer 95 when swung by rotating knob 94. When swung between these stops, the pace simulator device, by means of structure and circuitry described in more detail hereinafter, causes marks to be etched on chart 90 as the time study observer swings the pointer in unison to follow a particular rhythmic motion of the worker under study. By means of a pair of spaced switch contacts, the pace simulator is adapted to record only a selected center portion or segment of any motion to abstract a constant velocity portion of the motion, thereby eliminating acceleration and deceleration effects and providing a measurement which is indicative of "factor X," as will become apparent subsequently herein.

As best seen in FIG. 3, the left hand edge of lid 66 has a plastic strip 100 fixed thereto and extending therealong adapted for clamping one edge of a time study chart 102 onto the lid. Chart 102 is preferably rectangular and horizontally lined to provide spaces for writing in the various job elements of the motion and time study preparatory to making a time record of these job elements. Each space on the chart 102 is aligned with a translucent numbered button 104 arranged in a row on top wall 42 and illuminated from within by a lamp. Through structure described subsequently herein, each button 104 is illuminated when the correspondingly numbered key 54 is depressed, and extinguished when another key is depressed. Hence the operator always has a visual indication of the particular job element being timed in the motion and time study.

Turntable structure

Figure 4:
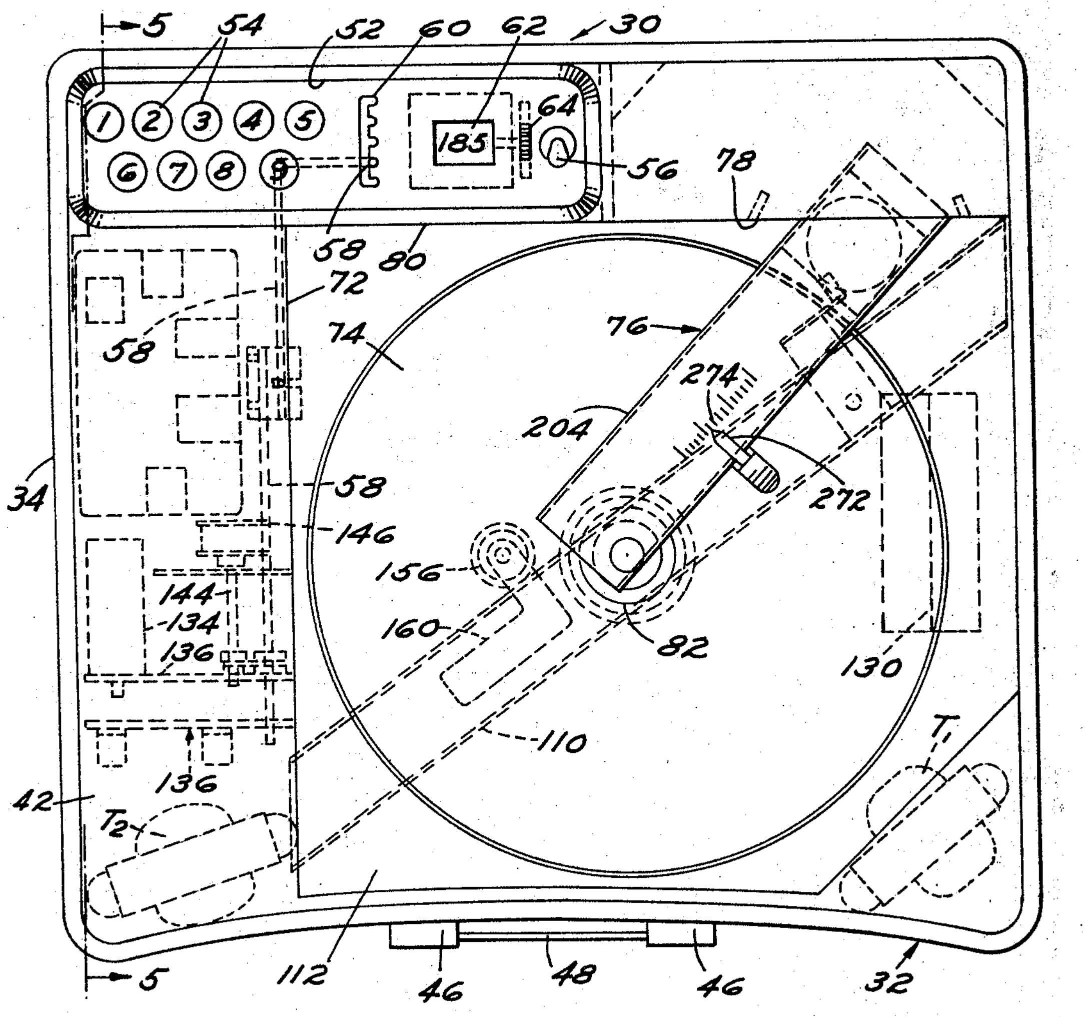
FIG. 4 is a top plan view on an enlarged scale of the time study machine with the lid removed.
Figures 5, 6:
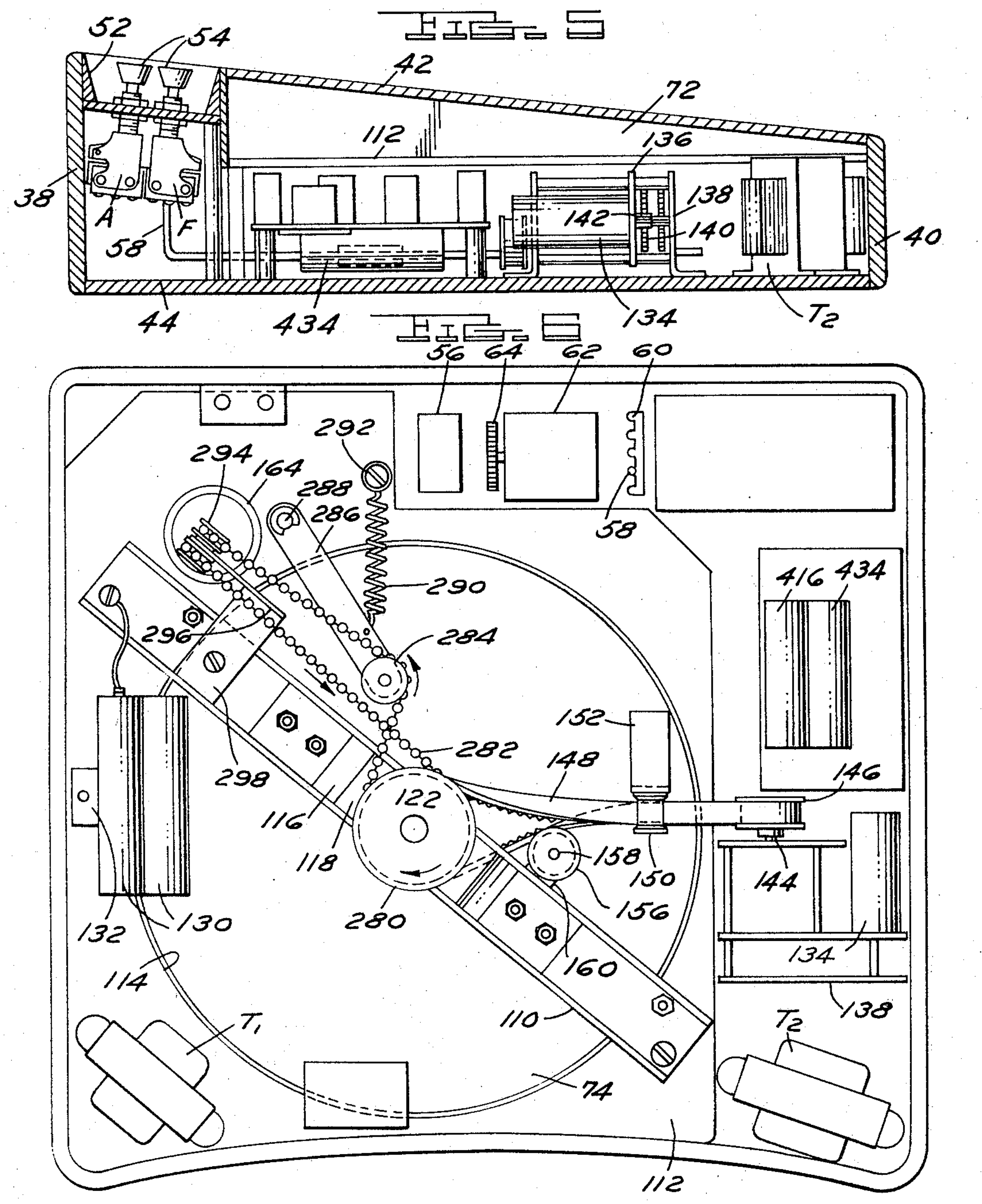
FIG. 5 is a vertical section taken on the line 5—5 of FIG. 4.
FIG. 6 is a bottom plan view of the time study machine with the bottom plate of the machine removed.
Figures 7, 8:
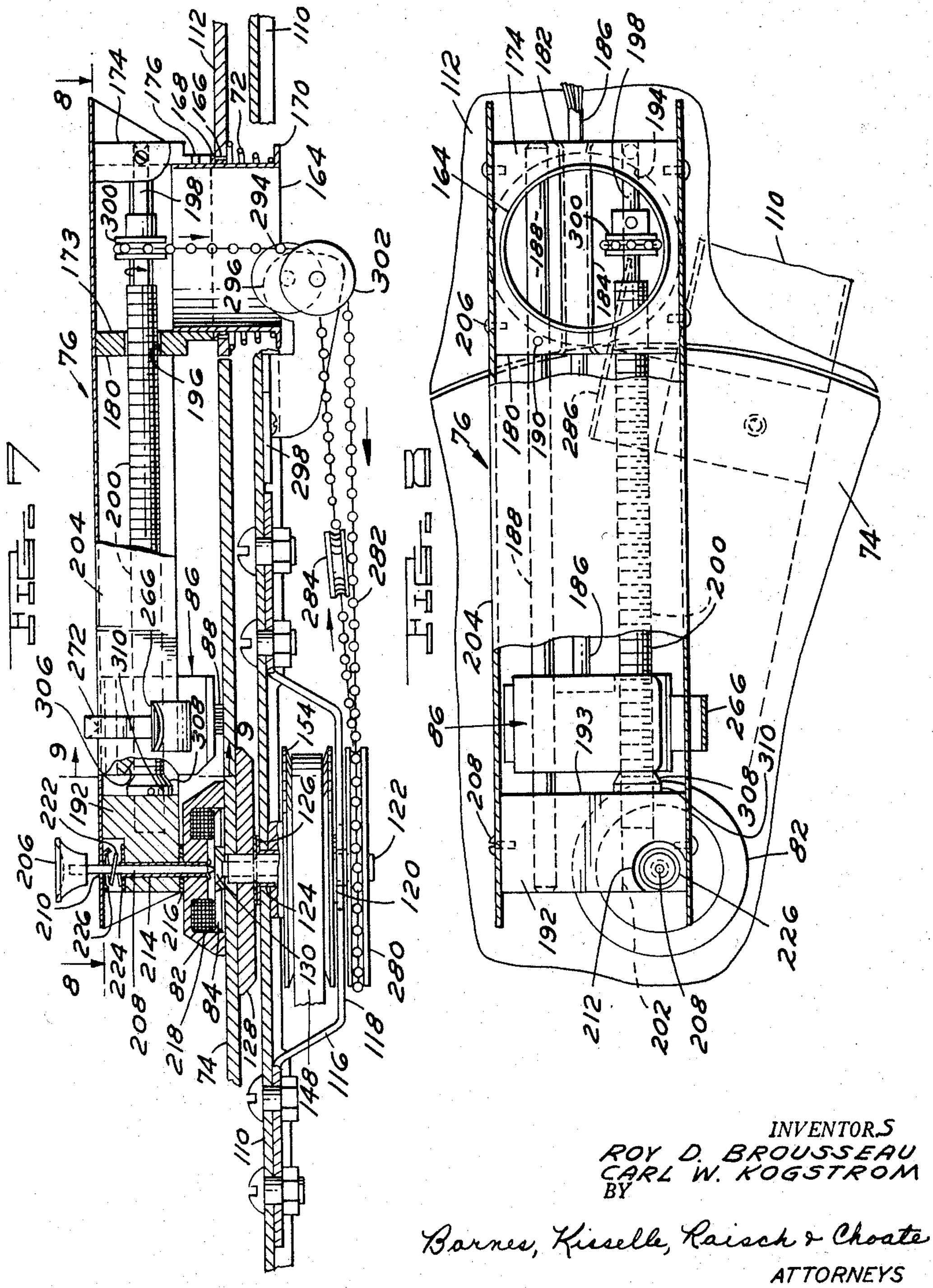
FIG. 7 is a fragmentary side elevational view of the recording arm assembly of the machine with portion of the arm, head and turntable mechanism associated therewith shown in vertical center section.
FIG. 8 is a top plan view of the structure shown in FIG. 7 taken partially in section along the line 8—8 of FIG. 7.

The supporting structure for turntable 74 is best seen in FIGS. 4, 6 and 7 and comprises an electrically conductive channel-shaped support member 110 secured at its ends to the underside of the bottom wall 112 of compartment 72, wall 112 in turn being spaced above bottom wall 44 of the case (FIG. 5). Support 110 extends diagonally across the circular opening 114 in wall 112 in which turntable 74 is disposed. A generally U-shaped strap 116 is secured at its ends against the underside of the web of support 110 and has a dependent center portion 118 (FIG. 7) apertured to receive a bushing 120 in which a spindle 122 is journaled. Spindle 122 extends upwardly through a nylon bushing 124 mounted in an aperture of the web of support 110 and is grooved to receive a snap ring 126 adjacent the upper side of bushing 124. A large washer 128 is received on spindle 122 on which turntable 74 rests. Turntable 74 is secured to spindle 122 for rotation therewith by a screw 130 which threads into the threaded upper end of spindle 122 to securely clamp turntable 74 between pedestal 84 and washer 128.

Turntable drive mechanism

The drive mechanism for turntable 74 comprises a self-contained power supply preferably consisting of a set of mercury batteries 130 mounted by a suitable bracket 132 on wall 44 (FIGS. 4 and 6) and suitably electrically connected through power switch 56 with a constant speed electric motor 134 mounted on a plate 136 of a conventionally arranged change speed gear box 138 (FIGS. 4–6). Gear box 138 is also mounted on wall 44 adjacent the left side of the case as viewed from above in FIG. 4 and contains a conventional arrangement of change speed transmission gears 140 which selectively couple a pinion 142 on the output shaft of the motor (FIG. 6) to the output shaft 144 of the transmission so that, through manipulation of the change speed control 58, five different drive speeds and a neutral idling condition are available between motor 134 and shaft 144.

A timing sprocket 146 is fixed to shaft 144 with its axis perpendicular to the axis of spindle 122 and has trained therearound one end loop of an endless timing belt 148 which is guided by an idler 150 (FIG. 6) rotatably mounted on a support block 152 fixed to wall 44. Beyond idler 150 belt 148 then makes a half twist due to its other end loop being trained to a larger timing sprocket 154 fixed on spindle 122 between bracket 116 and web 110 (FIGS. 6 and 7). One run of belt 148 is trained past a second idler 156 (FIG. 6) journaled on a post 158 supported by a bracket 160 affixed to support 110, idler 156 rotating about an axis perpendicular to the axis of idler 150 to insure proper running of the belt 148 through the 90° twist between sprockets 146 and 154. With this drive arrangement the opeartor, upon energizing motor 134 by flipping on switch 56, can select idle or one of five turntable speeds, for example: ¼, ½, 1, 2 and 4 r.p.m.

Recording arm assembly

Referring to FIGS. 4 and 7–10, recording arm assembly 76 has one end thereof universally mounted on deck plate 112 for horizontal and limited vertical pivotal movement by a cylindrical sleeve 164 (FIGS. 7 and 8) which extends vertically through an opening 166 in plate 112. Sleeve 164 carries a flanged nylon ring 168 adapted to fit into opening 166 with a clearance fit and which has a horizontal flange which rests loosely on the upper surface of deck 112 to serve as a universal pivot bearing for assembly 76. The lower end of sleeve 164 has a flange 170 for retaining the lower end convolution of a tapered coil compression spring 172 which abuts at its upper end against the undersurface of plate 112 to normally bias sleeve 164 to the vertical position. The upper end of sleeve 164 telescopes into a vertical bore 173 of a rectangular block 174 fixed to sleeve 164 by set screw 176. Block 174 has a central bore extending horioznatally between the front and rear sides 180 and 182 of the block in which a tube 184 (FIG. 8) is inserted for slidably guiding a multistrand electrical cable 186 therethrough (FIG. 8). A guide rod 188 extends through coaxial bores in block 174 parallel to tube 184 and is fixed in the block by a set screw 190. Rod 188 extends outwardly from face 180 of the block perpendicular to the axis of sleeve 164 to an end block 192 which is mounted on the outer end of rod 188 at a point generally above the center of turntable 74. On the side of tube 184 opposite rod 188 block 174 has a pair of coaxial bores 194 and 196 (FIGS. 8 and 7 respectively), bore 194 rotatably receiving one end of a small diameter shaft 198. The other end of shaft 198 is fixed in a threaded lead screw 200 which extends with a clearance fit through bore 196 parallel to guide rod 188. The outer end of lead screw 200 is journaled in a bore 202 in block 192. Blocks 174 and 192 are also interconnected by a channel-shaped sheet metal cover 204 secured by screws 206 and 208 to blocks 174 and 192 (FIG. 8).

The outer or free end of recording arm 176 carries a release button 206 (FIGS. 7 and 8) which is fixed to the upper end of a pin 208 which in turn extends downwardly through a hole 210 in the top wall of cover 204 into a circular cavity 212 of block 192 and thence slidably through a tube 214 fixed in a vertical bore of block 192, the lower pointed end of pin 208 abutting the upper end of screw 130. The lower end of tube 214 extends beneath block 192 through a washer 216 and thence through a center bore of clamping disc 82 to the underside of the recessed central area thereof. The lower end of tube 214 has a flange for retaining disc 82 in journaled relation on block 192. Disc 82 comprises a circular core made of magnetic material in which is mounted a permanent ring magnet 218 which causes disc 82 to be magnetically attracted to the upper surface of turntable 74 for clamping the inner margin of chart paper 90 between disc 82 and the turntable surface. In order to release this magnetic clamp, the operator pushes upwardly on the lip 220 of cover 204 while depressing button 206 to thereby lift disc 82 away from the turntable without thereby jerking the recording arm. Pin 208 is normally biased upwardly by a coil spring 222 disposed in cavity 212 between a washer 224 and a washer 226 secured to pin 208 beneath lip 220 of cover 204.

Recording head assembly

Figure 9:
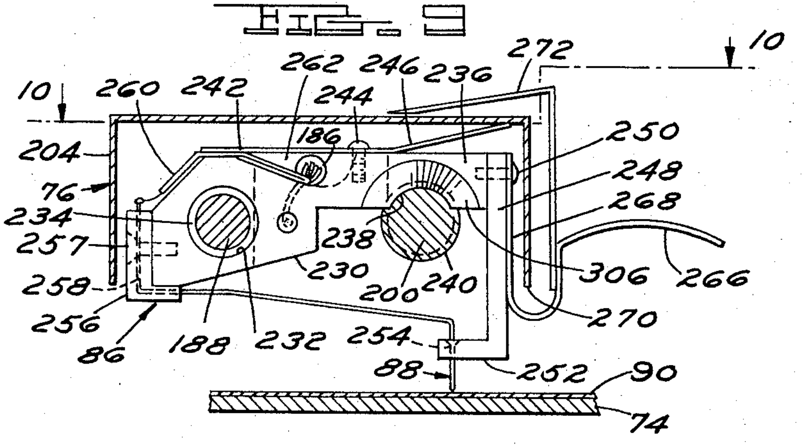
FIG. 9 is a vertical section taken on the line 9—9 of FIG. 7.
Figure 10:
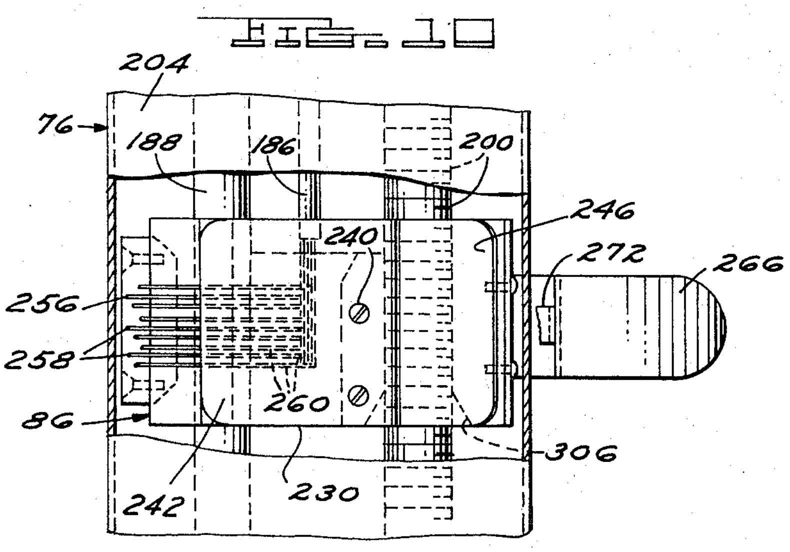
FIG. 10 is a fragmentary top plan view of the structure shown in FIG. 9 taken partially in section along the line 10—10 of FIG. 9.

The details of the recording head assembly 86 are best seen in FIGS. 9 and 10. Head 86 comprises a generally rectangular block 230 having a transverse bore 232 lined by a bushing 234 which slidably receives guide rod 188 therethrough. The underside of block 230 is cut away to form an arm 236 in which a row of internal half threads 238 are machined to mate with the external threads 240 of lead screw 200 when arm 236 rests on the lead screw as shown in FIG. 9 to thereby form a half nut type drive for head 86. A spring metal plate 242 is secured by screws 244 to the upper surface of block 230 and has a spring leaf 246 the free end of which slidably bears against the under surface of cover 204 to bias arm 236 into yieldable threaded engagement with lead screw 200.

An L-shaped bracket 248 is secured by screws 250 to the front face of arm 236 and has a foot 252 spaced above the upper surface of turntable 74. Foot 252 has nine holes extending in a row parallel to screw 200, each hole individually receiving one of the downwardly bent vertical ends of styli 88 to slidably guide and brace the same for yieldable tracking movement over the upper surface of chart 90. Each stylus 88 is bent at a point above foot 252 to extend generally horizontally to another L-shaped bracket 256 secured by screws 257 to the rear side of block 230. Brackets 248 and 256 preferably are made of electrical insulating material. The right angle terminal portions 258 of each stylus 88 are embedded in bracket 256 in spaced relation from one another to insulate them from another and from block 230. The upper ends of each stylus 88 are individually connected to leads 260 which extend from cable 186, the outer end of which is clamped in a cavity 262 by plate 242. With this arrangement the spring tension of each stylus wire 88 resiliently urges its free end downwardly into light tracking contact with chart 90, the styli being adapted to individually yield upwardly due to their cantilever mounting in bracket 256.

A fiinger bracket 266 is provided on head 86 for lifting and moving head 86 along arm 76. Bracket 266 has a vertical arm 268 attached by screws 250 to plate 248 which extends under and outwardly beyond the lower edge 270 of the side wall of cover 204 to provide a convenient means for lifting head 86 with one finger to pivot the head on rod 188 and thereby lift arm 236 upwardly against the pressure of leaf spring 246. This disengages threads 238 from the lead screw and also lifts styli 88 clear of chart 90. Head 86 may then be slid along rod 188 to position the same at any desired point between blocks 174 and 192. Bracket 266 carries a pointer 272 which overlies the upper surface of cover 204 and has a pointed terminal end which overlies a row of scale markings 274 on the upper surface of cover 204 (FIG. 4). This provides a convenient visual indication of the position of the recording head over the chart and also a direct reading of the amount of recording time consumed as well as that remaining.

Recording head drive mechanism

The drive mechanism for moving head 86 in synchronism with turntable 74 is best seen in FIGS. 6–10 and comprises a sprocket 280 (FIGS. 6 and 7) secured to and rotatably driven by spindle 122 beneath bracket 116. Sprocket 280 in turn drives an endless bead chain 282 which is trained at one end around sprocket 280 (FIGS. 6 and 7). The slack run of chain 282 runs from sprocket 280 over an idler 284 which is rotatably supported on the free end of an arm 286 pivoted at its other end on a post 288 suitably secured to plate 112. A tension coil spring 290 is secured by a screw 292 to plate 112 and has its other end hooked to arm 286 to yieldably bias idler 284 in a direction to maintain tension in the slack run of chain 282. The slack run of chain 282 runs from idler 284 over an idler 294 rotatably supported directly beneath sleeve 164 by an arm 296 of a bracket 298 secured to the underside of support 110. Chain 282 runs from idler 294 upwardly coaxially through sleeve 164 and thence up around a driven sprocket 300 fixed on shaft 198 to rotatably drive the same. Chain 282 thence runs downwardly 90° around another idler 302 also journaled on arm 296 and thence back to sprocket 280. Chain 282 also serves as a grounding conductor from turntable 74 via spindle 122 to member 110.

With the above arrangement, lead screw 200 is rotatably driven at four times the speed of turntable 74, and since the lead screw is driven from the turntable drive, this ratio is maintained constant for all turntable speeds. In the disclosed embodiment lead screw 200 has a double thread with a pitch of .100″ and hence with each revolution of turntable 74 head 86 moves radially of the table .400″. Lead screw 200 is adapted to threadably drive head 86 radially inwardly of turntable 74, or from right to left as viewed in FIGS. 7 and 8, the outer limit of travel of head 86 being established by face 180 of block 174 and the inner limit of travel being established by the inner face 193 of block 192.

In order to prevent head 86 from being jammed against block 192 at the end of a recording, the half threads 238 of arm 236 are beveled at their leading end (facing block 192) to provide a semi-conical camming surface 306 (FIGS. 7, 9 and 10) adapted to engage the conical surface 308 of a collar 310 (FIGS. 7 and 8) fixed to lead screw 200 adjacent block 192. Thus when the leading half cone 306 strikes the conical surface 308, the half nut 236 is cammed upwardly against the bias of leaf spring 246 to thereby disengage threads 238 and 240 and thus prevent the half nut from being locked against block 192. If the lead screw continues with head 86 in this condition, the head will continually recycle through such automatic disengagement, first being cammed out of engagement with the threads as it is driven up the conical shoulder 308 by threads 240, and then dropping back into the next thread of the lead screw to repeat this action. This recycling produces a clicking sound which is quite audible, thereby indicating to the operator that the recording time for the chart has expired and that it is time to replace the recorded chart with a blank chart.

Pace simulator

Figure 11:
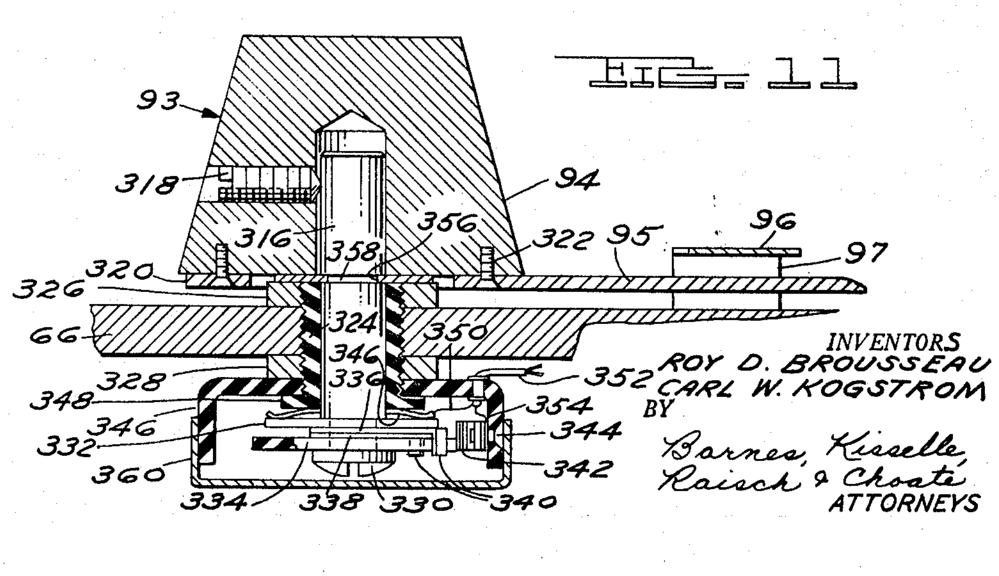
FIG. 11 is a vertical section taken on the line 11—11 of FIG. 3 and illustrating the pace simulator of the invention.

The structural details of pace simulator 93 are shown in FIGS. 3 and 11. As shown in FIG. 11, knob 94 of simulator 93 is adjustably secured on a post 316 by a set screw 318. Arm 95 has an annular portion 320 secured by screws 322 to the undersurface of knob 94. Post 316 extends downwardly through lid 66 and is journaled therein by a threaded insulating bushing 324 threaded in the lid and locked thereto against rotation by a pair of lock nuts 326 and 328 disposed on opposite sides of the lid. The lower end of post 316 is adapted to threadably receive a screw 330 which mounts an electrically conductive disc 332 and an insulating disc 334 on post 316 for rotation therewith. Discs 332 and 334 frictionally clamp therebetween a pair of contact members 336 and 338 each having an arm extending radially out to the periphery of disc 334 terminating at bent down ends to provide a pair of angularly adjustable contacts 340 adapted to ride past and make contact with a brush contact 342. Contact 342 may be in the form of a conductive spring member cantilevered mounted by a screw 344 on the inner wall of an annular insulating cup 346. Bushing 324 has a flange 348 at its lower end which clamps cup 346 stationarily against nut 328. A Belleville washer 346 is clamped between flange 348 and disc 332 in rubbing contact with disc 332 and has one conductor 350 of a lead 352 connected thereto. Lead 352 extends through cup 346 and has its other conductor 354 connected to screw 344 which serves as a terminal post for wiper 342.

The simulator assembly is completed by a snap ring 356 which snaps into a groove 358 of post 316 and cooperates with bushing 324 and disc 332 to limit axial movement of the post. A dust cover 360 has a slip fit on cup 346 to provide a sealed but readily opened housing for the electrical contacts of the simulator assembly.

In the operation of pace simulator 93, arm 95 is swung through a fixed angle as determined by the end limit stops 97 and 98, herein shown spaced by an angle of about 60°, or 30° either side of a zero center position shown in FIG. 3. Contact ends 340 may be adjusted relative to one another and relative to wiper 342 by removing cap 360 and unloosening screw 330 to unclamp the washer portions of contact members 336 and 338 to permit ends 340 to be moved along the periphery of disc 334 until for example they are equally spaced from wiper 342 on opposite sides thereof when arm 95 is centered on the zero position.

In accordance with the pace simulation method of the present invention, the angular spacing between contact ends 340 is some predetermined angle smaller than the angle between stops 97 and 98, as set forth in more detail hereinafter. When arm 95 is swung from one stop 97 to the other stop 98, contact ends 340 cooperate with wiper 342 to close and reopen a circuit (described subsequently herein) connected across leads 350 and 354 twice during each traverse of arm 95 between the end stops.

Electrical circuits

Figures 12, 13:
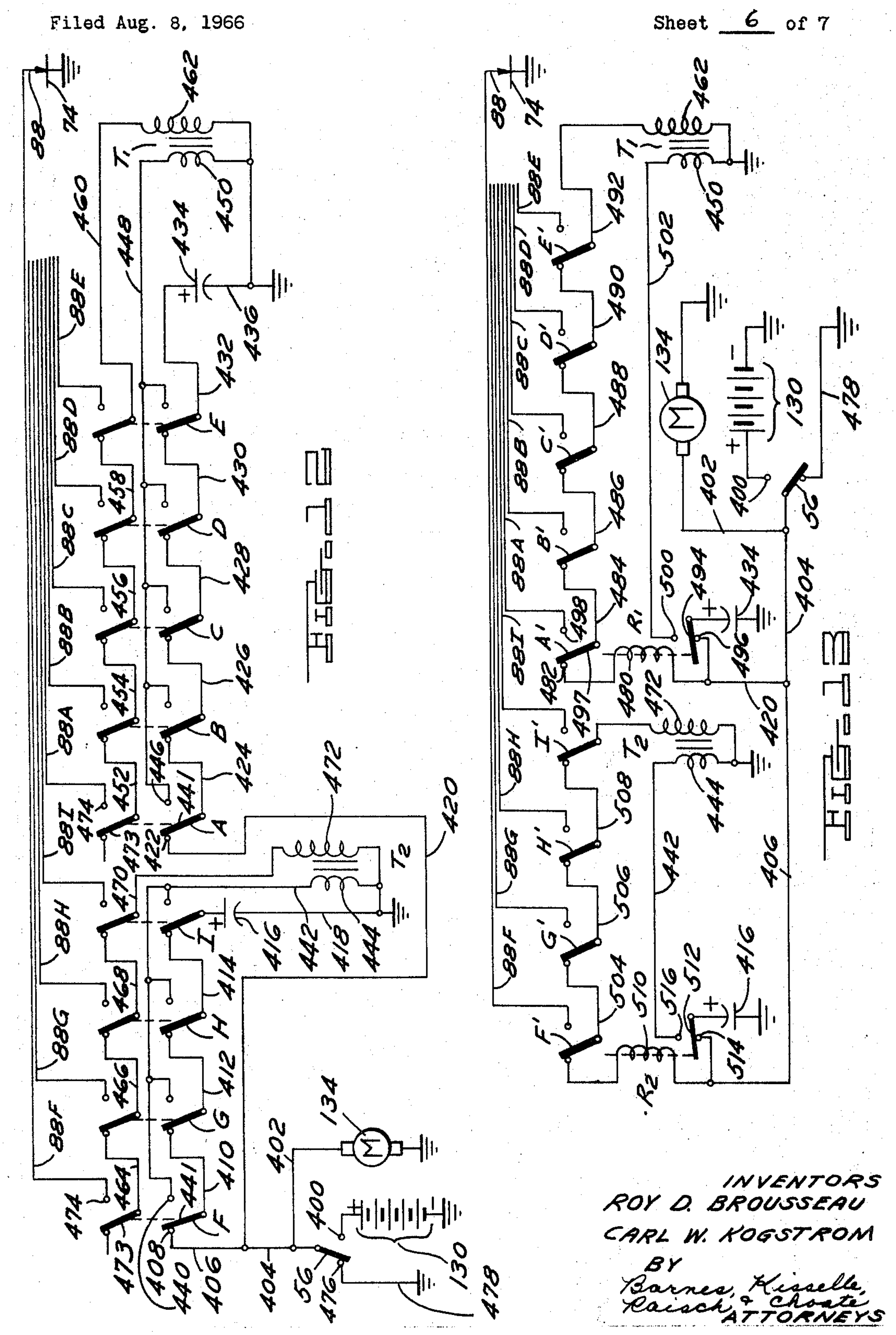
FIGS. 12, 13 and 14 are schematic diagrams of three alternative electrodischarge circuits which may be employed in the time study machine of the invention.
Figure 14:
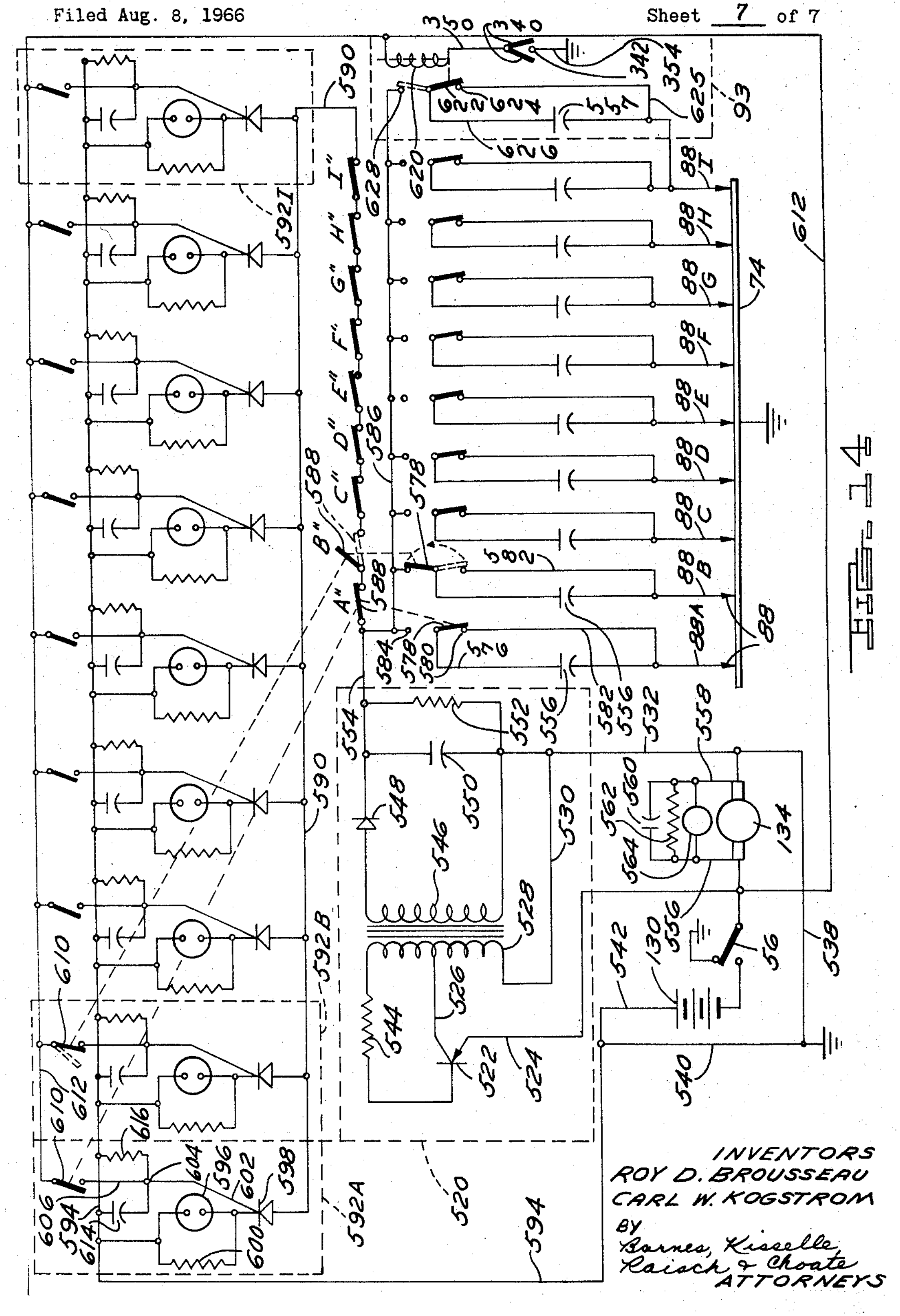

The electrical circuitry for time study machine 30 may take one of several forms, three of which are disclosed respectively in FIGS. 12, 13 and 14. Referring to FIG. 12, one form of a control circuit for time study machine 30 in accordance with the present invention may comprise battery 130 having its negative terminal grounded via plate 112 and support 110 to turntable 74. The positive terminal 400 of battery 130 is connectable by double pole single throw power switch 56 across motor 134 via conductor 402 when switch 56 is thrown from its open position shown in FIG. 12 to its closed position against contact 400. Switch 56 when closed is also adapted to connect battery 130 across two parallel banks of series connected switches A, B, C, D, E, F, G, H and I. These switches each consist of a single throw double pole normally open switch of well known construction actuated by a push button key 54 as illustrated in FIG. 5. Switches A–E shown in FIG. 12 correspond respectively to the five switches mounted in the upper row of switches seen in FIGS. 3 and 4 and are respectively actuated by push buttons 54 numbered 1–5 inclusive. Switches F–I of FIG. 12 correspond to those shown mounted in the lower row as seen in FIGS. 3 and 4 and are individually actuated by push buttons 54 numbered 6–9 inclusive respectively.

Each push button key 54 is spring biased to a raised position when the arms of the respective switches A–I are all thrown against their left hand contacts (in terms of the schematic showing in FIG. 12). When switches F–I are in this condition, switch 56 is connected via leads 404 and 406 to contact 408 of switch F and thence via leads 410, 412, 414 and the lower arms of switches G, H and I to one terminal of a capacitor 416 having its other terminal connected via lead 418 to ground. Similarly, when switches A–E are in this condition, switch 56 is connected via lead 404 and lead 420 to terminal 442 of switch A and thence via leads 424, 426, 428 and 430 and the associated lower switch arms of switches B–E inclusive to a lead 432 connected to one terminal of a capacitor 434 having its other terminal connected via a lead 436 with ground.

The normally open contacts 440 associated with each lower arm 441 of switches F–I inclusive are each connected to a common lead 442 which in turn is connected to one terminal of the primary coil 444 of a transformer $T_2$, the other terminal of coil 444 being connected to ground. Likewise, the normally open contact 446 of each of the switches A–E associated with the lower arm thereof are all connected to a common lead 448 connected to one terminal of primary coil 450 of a transformer $T_1$, the other terminal of coil 450 being connected to ground. The upper arms of each of the switches A–E are series connected with one another in their unactuated condition via leads 452, 454, 456 and 458 and, by a lead 460 connected to the upper arm of switch E, to one terminal of a secondary coil 462 of transformer $T_1$ which has its other end grounded. Similarly, each upper arm of switches F–I inclusive are series interconnected with one another in their unactuated condition by leads 464, 466 and 468, and via lead 470 to one terminal of the secondary coil 472 of transformer $T_2$, the other terminal of coil 472 being grounded.

Each of the upper arms 473 of switches A–I inclusive has a normally open contact 474 respectively connected to leads 88A–88I inclusive which in turn are connected one to each of the nine styli 88. Switch 56 in its "off" position illustrated in FIG. 12 contacts a terminal 476 connected via lead 478 with ground to provide a discharge path via leads 404, 406, 410, 412, 414 and the lower switch arms 441 of switches F–I inclusive for discharging capacitor 416, and via leads 404, 420, 424, 426, 428, 430, 432 and arms 441 of switches A–E for discharging capacitor 434.

In the operation of the circuit of FIG. 12, closure of power switch 56 against terminal 400 energizes motor 134 which in turn drives turntable 74 at one of the five speeds as selected by lever 58. Closure of switch 56 also connects capacitors 416 and 434 across battery 130 via the series interconnected arms 441 of switches A–I inclusive to thereby charge capacitors 416 and 434 to the potential of battery 130.

If any one of switches A–E inclusive is now actuated by manually depressing one of the keys 1–5, this will throw lower and upper arms 441 and 473 of the actuated switch against contacts 446 and 474 respectively. It is to be understood that each switch A–I is suitably designed so that arm 473 closes against contact 474 just prior to closure of arm 441 against contact 446 as the switch key is depressed. Opening contact 422 disconnects capacitor 434 from battery 130 and closing contact 446 connects the charged capacitor to lead 448, whereupon capacitor 434 discharges through coil 450 of transformer $T_1$. This pulsing of coil 450 induces a stepped up voltage pulse in secondary 462 which is now conected via lead 460 and the upper switch arms 473 of the unactuated switches between lead 460 and the actuated switch, the upper arm of which is closed on its contact 474. The secondary coil 462 is thus connected to the particular one of the styli leads 88A–88E associated with the actuated switch to thereby impress the induced high potential between the terminal end of the stylus 88 and the chart 90 disposed on conductive turntable 74, which is at ground potential. Hence, upon actuation of switch A, for example, a current flows between stylus 88A and chart 90 to thereby burn or break down the low resistance surface coating which has a contrasting color relative to the subjacent filler layer of chart 90, thereby forming a visible dot on the upper surface of chart 90. Likewise, actuation of any one of the switches F–I inclusive by depressing one of the lower row of keys 6–9 disconnects capacitor 416 from battery 130 and then conencts the same across primary coil 444 to discharge the capacitor, the pulse of current generated through coil 444 inducing a high voltage pulse in secondary coil 472 which is connected via the upper arm of the actuated switch to the associated stylus to burn a dot on chart 90.

By grouping the nine switches in two banks with a capacitor 416 and 434 for each bank, it is possible to operate any one of the push buttons in the upper row simultaneously with any one of the push buttons in the lower row. This produces two radially aligned dots on chart 90 and may be used to identify foreign elements or other events in the time study in addition to the information individually coded to each of the nine push buttons.

Upon release of finger pressure from a push button, the same is biased back to the position illustrated in FIG. 12 which disconnects the stylus from the secondary coil 462 or 472 and reconnects the associated capacitor 434 or 416, now discharged, to battery 130 to thereby recharge the capacitor. The capacitors 416 and 430 have a charging rate such that they reach full charge in much less times than it takes to manually release one push button and depress another push button. Hence there is no need for the operator to pause between actuation of push buttons since the machine will respond and burn dots on chart 90 as fast as even the most dexterous operator can "play" the keyboard.

The control circuit shown in FIG. 13 is somewhat similar to that shown in FIG. 12 but represents a simplification in that the push button actuated switches A′–I′ corresponding to switches A–I of the FIG. 12 circuit are single pole single throw switches. This is made possible by the addition of a pair of relays $R_1$ and $R_2$ for the upper and lower banks of keys respectively. Relay $R_1$ has a relay coil 480 connected at one end to the positive terminal of battery 130 by power switch 56 and leads 404 and 420. The other side of coil 480 is connected to the negative terminal of the battery through a normally closed contact 482 of switch A′, thence through the remainder of the series interconnected switches B′, C′, D′ and E′ and leads 484, 486, 488 and 490 of the upper bank and thence through a lead 492 and the secondary coil 462 of transformer $T_1$ to ground. Hence when switch 56 is thrown to the "on" position against the contact 400, coil 480 of relay $R_1$ is energized. When so energized relay $R_1$ is adapted to hold its contact arm 44 closed against contact 496 connected to lead 420 to thereby connect capacitor 434 across battery 130 for charging the capacitor. When any one of the switches A′–E′ of the upper bank are actuated by depressing one of the push buttons 54 associated therewith, switch arm 497 of the actuated switch is thrown into contact with the normally open contact 498 of the switch. Opening of the connection between switch arm 497 of the actuated switch and the normally closed contact 482 opens the circuit energizing relay coil 480, thereby allowing arm 494 of relay $R_1$ to close against contact 500 of the relay. This connects the charged capacitor 434 via lead 502 to primary coil 450 of transformer $T_1$, thereby discharging the capacitor through the primary and inducing a high voltage across the secondary 462 of transformer $T_1$. Since the secondary 462 is now connected via the switch arm 497 of the actuated switch to the associated styli lead 88A–88E, a spark is generated at the associated styli to burn a dot on the chart disc.

The lower bank of switches F′–I′ are similarly series interconnected in their normally closed position via leads 504, 506 and 508 to connect one side of the coil 510 of relay $R_2$ across battery 130 via the secondary coil 472 of transformer $T_2$ and the other side via leads 406, 404 and switch 56. When relay $R_2$ is thus energized, arm 512 is held against a contact 514 to charge capacitor 416. When any one of the switches F′–I′ is actuated, relay $R_2$ is deenergized, allowing its arm 512 to close against contact 516 to thereby connect the charged capacitor 416 across primary 444 to thus induce the spark voltage in the secondary 472, which in turn is connected via the actuated switch to the associated styli to burn a dot on the chart paper.

FIG. 14 illustrates by way of example the presently preferred commercial form of control circuit for time study machine 30. The circuit of FIG. 14 incorporates a conventional transistorized DC to DC convertor indicated within the broken line 520 which includes a transistor 522 having an emitter connected via lead 524 and power switch 56 to the negative terminal of battery 130 and a collector connected via lead 526 to the center tap of the primary coil 528 of a step up transformer. One end of primary 528 is connected via leads 530, 532, 538, 540 and 542 to the positive terminal of battery 130. The base of transistor 522 is connected through a resistor 544 to the other end of primary 528 of the transformer. The end terminals of secondary coil 546 of the transformer are connected across a rectifying diode 548 connected to a parallel combination of a smoothing capacitor 550 and resistor 552. Converter 520 operates in a well known manner to generate an AC potential across the primary of the transformer from the DC input from battery 130, the stepped up voltage across the secondary 546 being rectified in the output stage of the convertor to provide about 200 volts DC between the output lead 554 of the convertor and ground.

Motor 134 is connected across battery 130 by power switch 56 and leads 538, 540 and 542. If desired, a metering circuit may be connected by leads 556 and 558 across motor 134 which includes a capacitor 560, a resistor 562 and a voltmeter 564 adapted to indicate the voltage drop across motor 134 and thus indirectly the condition of charge of battery 130.

Each of the nine styli 88 is individually connected by its associated lead 88A–88I with a capacitor 556 the other side of which is connected by a lead 576 with one terminal of a switch arm 578 of a triple gang switch actuated by one of the push buttons 54 of the keyboard. Switch arm 578 is normally closed against a contact 580 connected by lead 582 to the other side of the associated capacitor 556 to provide a discharge loop for the capacitor. Each of the switches A″–I″ has a normally open contact 584 connected by a common lead line 586 to the output lead 554 of the power supply 520. Switch arm 578 of each switch is adapted to move out of contact with contact 580 and into engagement with contact 584 when the push button 554 associated therewith is depressed. This connects the uncharged capacitor 556 across the power supply lead 554 and ground potential, normally a potential difference of 200 volts DC, thereby producing a sudden rush of charging current across the capacitor which in turn produces an arc between the associated stylus 88 and turntable 74 to thereby burn a dot on the chart disc 90. When the push button 54 is released, arm 578 returns to the normally closed position relative to contact 580, thereby disconnecting capacitor 556 from the high potential line 586 and discharging the capacitor from one side thereof to the other so that it returns to an uncharged condition.

Each of the switches A″–I″ also includes a second arm 588 ganged to arm 578 and interconnected in series with each of the other arms 588. Switch arm 588 of switch I″ is connected via a lead 590 to one side of each of nine parallel connected and identical lighting circuits 592A, 592B, etc. Each lighting circuit 592 is connected on its other side to a common lead 594 connected to the positive terminal of battery 130. Each lighting circuit 592 includes a neon bulb 596 having one terminal connected to common lead 594 and the other terminal to the anode of a silicon controlled rectifier 598 which has its cathode connected to a common lead 590. A biasing resistor 600 is connected across bulb 596. The gating electrode 602 of the SCR is connected through a junction point 604 via a lead 606 with a normally open contact 608 associated with the third arm 610 of the push button switch A″, arm 610 being ganged for actuation with arms 588 and 578 to close against contact 608 when the switch button 54 associated therewith is depressed. This connects the negative terminal of battery 130 with gate 602 via the common lead 612 and power switch 56 to provide the gating signal for firing the SCR of the associated lighting circuit. Each lighting circuit also includes a capacitor 614 connected between lead 594 and junction 604 and a resistor 616 connected in parallel with capacitor 614 between lead 594 and junction 604.

Each neon lamp 596 is individually associated with one of the plastic buttons 104 mounted in the upper surface 42 of the time study machine 30, lamp 596 of lighting circuit 592A being mounted beneath button No. 1 and switch A″ being actuated by the push button 54 bearing the numeral 1, and so on. Thus for example when push button No. 2 is depressed, this moves switch arm 578 out of contact with contact 580 and into contact with contact 584 to connect styli 88B across the sparking potential supplied by line 554 to burn a dot on the chart. Simultaneously, switch arm 588 is opened to extinguish any of the lamps which may remain lit from the previous push button actuation. Switch arm 610 is also simultaneously moved from its normally open position into contact with contact 608, thereby connecting the associated capacitor 614 across battery 130 via leads 594 on one side of the capacitor and on the other side of the capacitor through junction 604, lead 606, switch arm 610, lead 612 and power switch 56. This charges capacitor 614 to the potential of the battery at the same time that a dot is burned on the chart by depressing the push button.

Upon release of the push button, switch arm 578 closes against contact 580 to discharge the capacitor 556, and simultaneously switch arm 588 closes to thereby reconnect the output lead 554 of the power supply across the lighting stages while the actuated switch arm 610 reopens contact 608 to disconnect the capacitor 614 from the battery charging potential. Since capacitor 614 is connected to the gating electrode 602 of the SCR, it supplies firing potential to the SCR which thereupon fires upon closure of contact arm 588 to energize the neon lamp 596 of stage 592B and thus illuminate button No. 2. This indicates to the operator that push button No. 2 has just been pushed and released, and therefore that element No. 2 was the last element recorded. Once the SCR has been fired, it remains on, the lamp being energized by the power supply through leads 594 and 590. After supplying the gating or firing signal for the SCR, the capacitor 614 is gradually discharged through the bleed resistor 616. The lamp of stage 592B remains lit until another or the same push button is actuated which, by opening switch arm 588, disconnects the SCR from the power supply lead 554 and thus turns off whichever SCR is on at that time.

The circuit of FIG. 14 also illustrates how the pace simulator 93 may be incorporated into the electrical circuitry of time study machine 30 to operate through the ninth stylus, herein shown as the stylus associated with lead 88I. The pace simulator 93 as described previously includes the pair of angularly spaced switch contacts 340 adapted to slip across and successively make contact with the wiper 342 as arm 95 is rotated through its arc of travel between stops 97 and 98. In order to record the time it takes for the arm to travel through the predetermined angular spacing between the pair of contacts 340, wiper 342 may be connected by lead 354 to ground potential and lead 350 connected to a coil of a relay 620. This relay includes a contact arm 622 biased in the deenergized condition of the relay coil into contact with a contact 624 connected via lead 625 to one terminal of a capacitor 557 on the side of the capacitor to which lead 88I is connected. Contact arm 622 is connected via lead 626 to the other side of capacitor 557. Thus when arm 622 is closed against contact 624 a discharge loop is completed for discharging capacitor 556.

When either of contacts 340 close against wiper 342, relay coil 620 is energized to thereby attract arm 622 out of contact with contact 624 into contact with a contact 628 connected to lead 586 to thereby connect the uncharged capacitor 557 across the power supply 520 and thus generate a spark between stylus 88I and turntable 74. As soon as each contact 340 breaks connection with wiper 342, relay coil 620 is deenergized, allowing arm 622 to reclose against contact 624 to discharge capacitor 557.

The electrical circuitry described above in conjunction with FIG. 14 thus provides a highly versatile circuit which permits any one of the nine keys to be energized alone or in combination with any one or more of the remaining keys due to the fact that each switch is associated with its own capacitor 556. Due to the provision of the DC convertor 520, the step up transformer of the previous circuits of FIGS. 12 and 13 is not needed and each of the capacitor 556 can be much smaller in capacity. Convertor 520 also facilitates the incorporation of a connection to an external source of alternating current. For this purpose another primary coil may be added in coupling relation to secondary 546, the auxiliary primary being connected across leads adapted for connection to the outside source of AC current, thereby making it possible to conserve battery 130 when external power is available.

The circuit of FIG. 14 also provides illumination of the numbered buttons 104 located adjacent the job elements assigned on the job analysis sheet 102. This greatly simplifies the task of the time study operator since he need not rely on his memory but can check the numbered buttons should it be necessary to reorient himself in any particular phase of the time study. This feature also makes it possible for the operator to quickly discover if he has pushed the wrong button so that he can correct the error immediately and thereby still salvage the time study.

Operation of events recorder

The operation of the time study machine of the present invention will be apparent to one skilled in the art from the foregoing detailed description, but it is believed that an example of the way the time study machine of the invention may be used in making a time study will further facilitate a comprehensive understanding of the present invention.

The general procedure involved in taking time studies with the events recorder 30 of the present invention is the same as taking a time study with a stop watch except, of course, the elemental results will be much more refined and concise since the restrictions and limitations of stop watch time studies are not present. When a production operation is being planned, a time study engineer first organizes the proper sequence of steps, establishes the best feeds and speeds for machining, and attempts to combine cuts and motions for efficiency, where possible, the same as with presently used prior art methods. Then he proceeds to break down the operation into "elements" for time study purposes. However, with the events recorder 30 the time study engineer is no longer restricted in his choice; that is, he is no longer limited by a need to consider a sequence of fast motions as one element group since successive elements of as little as ⅓ of a second can be recorded with ease. This allows a far more detailed breakdown than is possible with a stop watch. Thus the observer will determine the breaking points based on the requirements of the data being gathered rather than being limited by his capabilities in making pencil recordings.

Next the observer or engineer writes down the element descriptions on the time study sheet 102 (FIG. 3), assigning the numbers of push buttons 54 individually and in sequence to each of the successive elements. If there are more elements than push buttons, all push buttons with the exception of the first one are reassigned in sequence. Thus button No. 1 will always indicate the beginning of an operation.

Then the observer hooks the clips 46 to his belt and places the padded strap 50 around his neck as shown in FIG. 1. Since recorder 30 is completely portable and lightweight, the observer can walk around with the recorder suspended in a convenient recording position. Since the recorder has its own power supply, there is no need to remain in the vicinity of a power outlet. When the observer reaches the operation he wishes to study, switch 56 is flipped to the "on" position, thereby energizing motor 134 and placing the recording circuit in an energized condition as described previously in connection with the circuits of FIGS. 12–14. The observer then selects the desired chart speed and shifts select lever 58 to the notch 60 corresponding to the chart speed desired, for example: ¼, ½, 1, 2 and 4 r.p.m. Normally, the higher speeds are used when greater accuracy is desired since the amplitude of the angle between chart markings for any unit of time is dependent upon the selection of chart speed. For example, a time period of one second at ¼ r.p.m. chart speed is equal to an angular measurement of 1½°, and at 4 r.p.m., 24°.

The observer then watches the worker performing the job being time studied and presses the key assigned to each job element as the worker initiates that task. Normally this involves simply pressing buttons 54 in numbered sequence as each job element is initiated in succession, without requiring the observer to divert his eyes from the worker. Elemental recordings are made at a speed limited only by the manual dexterity of the observer in operating the push buttons. Preferably the keyboard is operated by assigning a finger to each key, much like the touch method used in typing or playing the piano. Through actual experience, it is found that a touch technique can be developed whereby every element within an operation can be recorded individually. Hence there is no need for grouping elements that are too fast to time individually by the stop watch method. In actual time studies taken with recorder 30, elements or movements as small as .0050 minute (or 1/3 second) in duration were recorded to the nearest .0010 minute in sequence. This compares to the usual results obtained by reading a stop watch wherein elements only as small as .030 to .040 minute (1.8 and 2.4 seconds) and to the nearest .010 minute in sequence are obtainable.

As the observer depresses the key that has been assigned to each element, the stylus 88 associated with that key discharges across the conductive chart paper 90 to the grounded turntable 74, thereby burning a visible hole on the surface of the chart which is visible as a black dot to the naked eye against the white background of the top layer of the chart.

If, during the taking of the time study, a worker stops to pick up a dropped part, or has to pry loose a piece that is stuck in a press die, the observer records the occurrence of this event by pressing two buttons simultaneously to record the time spent by the worker on this non-routine interruption. The two dots provide a code which indicates either a "foreign" element, one not put into the operation, or a "special" element, one that is not part of the regular cycle but must be prorated over an occurrence frequency and figured into the average time per piece. Different two-key combinations are used to indicate these two types of elements.

Method of rating pace and pace simulator operation

The pace simulator 93 described in detail previously may be used either alone or in conjunction with push buttons 54 during the taking of the time study. Simulator 93 represents a preferred apparatus for performing the method of the invention in which an operator's performance is recorded during an actual time study to provide a pace comparison often referred to in the art as "factor X." Hitherto, time study men have judged an operator's performance or pace by using the observer's individual concept of 100% normal as a base. Therefore with prior art techniques standardization of pace could not be accomplished. Before any unit can be standardized, regardless if it be length, weight, time or work pace, a measuring method and device for performing that method must be provided. Pace simulator 93 of the present invention provides such a device, and the subsequent description of its operation will also explain the method of the invention for measuring pace to thereby provide data for pace comparison or factor X.

The pace measuring method and pace simulator device 93 of the present invention is based on the principle that any limb movement of a worker can be broken into three major elements. The first element is the acceleration movement, the second a period of relatively constant velocity motion and the third the deceleration motion. In very short movements of the hand or arm, the second element may be of such short duration that it would be impractical to measure. However, in many types of operations a worker engaged, for example, in repetitiously picking up an object will develop a rhythm to his movements. The consistency of such an element, especially the velocity of the second element, can be measured with simulator 93. If the velocity is measured during the second element of the worker's motion, this velocity measurement can be used to compare one operator with another. A standard may then be established for a given type of movement and all similar movements performed under similar conditions may be compared and rated to an established standard, thereby providing a method that will facilitate a comparison by a time study observer of the relative efficiency of the worker's body movements, sometimes referred to as "factor X" in time study theory.

Pace simulator 93 provides a hand operated device that will enable a time study engineer to measure the pace or tempo of an operator's motions during the recording of a motion time study on recorder 30. This is accomplished by the observer swinging arm 95 by finger manipulation of knob 94 so that arm 95 follows the operator's limb motion back and forth in performing a particular job element, thereby simulating the operator's tempo of motion. If the operator increases or decreases the tempo of this motion, the time study engineer also increases or decreases the velocity of rotation of arm 95 in direct proportion to the operator's change in tempo or rhythm of motion.

When pace measurements are being made during the taking of a time study, the time study engineer makes elemental recordings by using the fingers of his left hand to operate push buttons 54, while his right hand is used to operate simulator 93 to obtain data for the pace comparison factor. Knob 94 is rotated back and forth in exact unison with the operator's motion and in such a manner so that the pointer or arm 95 hits stops 97 and 98 coincidental with the starting and stopping or end limits of the operator's motions. The pointer thus always swings through the same distance regardless of the actual distance traversed by the limb of the oeprator being observed. The total angle thus traversed by pointer 95 represents the total simulated angle of motion between stops 97 and 98 and will be referred to as angle Y. During this swing through angle Y, switch contacts 340 cause two angularly spaced dots to be burned in the ninth channel on chart 90 by stylus 88I. The angular spacing between these two dots, herein termed angle X, is thus less than angle Y and is determined by the preset adjustable spacing of contacts 340 relative to the angular spacing of stops 97 and 98. Angle X represents the portion or segment of the motion that is to determine the pace comparison. The two dots thus produced for each swing of arm or pointer 95 are read the same as all the other elements—the duration from one dot to the other. Thus there will always be two dots on the ninth channel whenever the simulator is swung in either direction. Normally these two dots will be internal to the manual element motion.

In accordance with the present invention, angle X is set to coincide with the second or intermediate period of relatively constant motion which occurs between the end limits of the limb movement of the worker. In the illustrated embodiment angle X is adjustable to any range from 30° left to 30° right of the center point indicated by scale markings on the transparent plate 96. This is accomplished by loosening screw 330 and adjusting the spacing of contacts 340 so that they make contact at the desired point in the swing of pointer 95, and then retightening screw 330. By so adjusting the simulator 93, a portion of the motion is extracted which represents a constant time value due to the distance between the switch contacts remaining constant during operation of simulator 93.

Normally, pace simulator 93 and the method of the invention should be used in measuring manual motions where motion equals accomplishment. An example of this principle would be a situation where an operator picks up a piece and moves it to another location. Another example would be where an operator strikes a punch with a hammer to center punch a piece of sheet metal for drilling. In these two examples, motion is accomplishment.

By way of example, assume that contacts 340 are set at 10° left and 10° right of the center point between stops 97 and 98 so that pointer 95 travels over an angle X of 20° for every rotation or back and forth motion of knob 94 and pointer 95. Even though pointer 95 is rotated the full distance between stops 97 and 98, which for example may be 60°, switches 340 are now set so that a dot is made on chart 90 when the pointer travels past 10° left and 10° right. The angular spacing between these two points when divided by the angular velocity of turntable 74 represents the time that the limb or other object being observed in motion took to travel through the middle one third (20°÷60°) of its path of travel. Assuming that the time duration thus recorded for the 20° swing is .003 minute, this time value then establishes a pace comparison factor for that motion which is based on a total of 20°.

As long as the switches are so set, any increase or decrease in the tempo of the operator's motion will be tracked by the operator with pointer 95 and cause a corresponding change in pointer velocity and hence the recorded pace comparison factor. For example, should the operator exactly double the tempo or rhythm of motion, the time study engineer swings pointer 95 at this faster tempo to maintain it in unison with the limb motion, resulting in the spacing of the two dots being exactly half to produce a pace comparison measurement of .0015 minute for the 20° angle X. Thus any change in the velocity of limb motion will likewise affect the travel time of pointer 95 through angle X and this is true regardless of the distance between the observer and the worker. Accordingly when the operator increases or decreases his pace or rhythm, the proportional change will be present in the recorded pace comparison factor.

Preferably the time for the measured motion is converted to a minutes per degree base so that a company can establish a normal 100% pace comparison factor based on a minutes per degree base. Assuming that .00015 minute pace comparison factor is established in a given company for a particular classified motion, the time study engineer would know that if switch contacts 340 are set at 10° left and 10° right, the total time for that motion or the pace comparison factor should be (20×.00015=.003) .003 minute. In other words, if this is a "pick up small piece and position into nest of die" element, and 100% normal for this type of motion has been established at .00015 minute per degree, the time study engineer would expect to receive .003 minute for a normal pace. If the actual measurement recorded is .003 minute, the time study engineer knows this is 100% normal and he no longer has to rely on any subjective concept of 100% normal based on his judgment because any time value or factor that is received for this type of motion can be normalized mathematically.

For example, assuming the measured pace comparison factor for this motion is .004 minute, it is immediately apparent that the operator's pace was slower than 100% normal because the time is greater than the normal time of .003 minute. However, this element can now be normalized to 100% normal by dividing .003 normal by the recorded .004 minute factor to give a rating factor of 75% which is used to normalize this motion to .003 minute or .00015 minute per degree as established by the company as being 100% normal for this type of motion. In other words, the operator was actually working at 75% of the theoretical pace for manipulation of this element, using .003 minute as normal. Assuming the time recorded by push buttons 54 for the job element was .0300 minute, then this recorded elemental time of .0300 minute is multiplied by the computed rating factor of 75% to equal the normalized elemental time of (0.3×75=.0225) .0225 minute. The .030 minute recorded is thus reduced to .0225 minute so that the elemental pace corresponds with the established normal, thereby correcting for the fact that the operator was working at 75% of theoretical pace and permitting the motion study data from this particular study to be used as a valid comparison in established work standards.

When statistically sufficient data has been gathered, a pace comparison factor may be established for every manual motion where motion equals accomplishment. It is not necessary to use simulator 93 to measure pace of all motions; a reliable average can be arrived at by using it intermittently, say every four or five pieces, and any change in pace or rhythm will still be evident and sufficiently reliable for use in normalization.

Once a standard pace comparison factor has been negotiated between management and labor, a time study engineer could mathematically normalize all motions of that classification to the standard pace comparison factor, thereby obtaining an accurate reproduction of the pace which was negotiated. After taking the time study and simulating the operator's motions with simulator 93, he will have a time study that encompasses not only infinitely refined elements but a pace comparison factor for all repetitive rhythmic motions. After reading all the data from chart 90, he will then proceed to normalize all manual motions as compared to the negotiated pace comparison factor. The time study engineer can normalize every individual manual recording if he wishes, or he can add up all the actual pace comparison factors and divide by the number of pace comparison factors to arrive at an average pace comparison. This average pace comparison factor can be used to normalize the element.

It has been found that pace simulator 93 is applicable to motions that are within the operator's normal working zone or reach. After an operator once falls into a rhythmic motion pattern, he will move different distances within his normal working zone but all in the same period of time. One motion might be 20" and the next 15" but both moves, regardless of the variation in distance within a given work area or zone, will still take exactly the same time to perform, providing the motions are rhythmic. Therefore, the important thing to consider when rating pace is the rhythm involved.

In order to establish a standard pace comparison factor, it would be necessary to classify the different types of motions according to the various conditions involved in the task such as the weight or difficulty that is involved with the motion. In negotiation of standard pace factors, such tables of weights, zones, etc., would be established for the different class motions and also other conditions such as heat, pieces oily, etc., could be likewise arrived at.

In summary of the principle of pace simulation method of the invention, a time study man extracts from a given human motion a segment of that motion that directly reflects any variation in the tempo at which the worker is performing his job. This measurement can then be used for comparison against data obtained for this motion when performed at a different pace. This is accomplished by tracking the motion from start to stop from an observation point, as by rotating the pace simulator 93, and causing this simulated motion to record an intermediate interval of the simulated motion corresponding to a linearly varying segment of the observed motion, as by actuating switches 340 which are preset at intermediate points of the full motion. The recorded measurement is then converted to a pace factor which provides a constant factor for comparison against other motions.

The extracted time for the constant velocity period provides a much more accurate indication of worker pace than does the time for a complete motion from start to finish. The complete motion time period does not provide a true picture of the motion because it includes the start and finish periods where most fumbling or difficulty occurs. For example, an element of "pick up piece and position into nest of die" could include difficulty during the "pick up," such as the pieces tangling together or fumbling during the positioning into die nest. Hence the time for the complete motion is subject to distortion and not easily validated due to the problems involved in any attempt at segregating the difficulty segments in order to arrive at a true pace comparison factor.

It would not be necessary to use pace simulator 93 at all times when taking a time study with recorder 30. Rather, it is preferably used with discretion where it is advantageous to extract a constant segment from a motion, as where possible difficulty factors such as fumbling, etc. exist in the motion. Thus simulator 93 when combined with recorder 30 is a tool that is available when conditions and circumstances warrant the additional refinements and precision which this method and instrument provide in taking motion time studies.

From the foregoing description, it will now be apparent that the events recorder 30 and the pace simulation method and apparatus 93 of the present invention amply fulfill the stated objects and offer many other advantages in the field of industrial engineering. Time studies taken with recorder 30 provide greatly improved results over stop watch studies from the standpoint of accuracy of recordings, more refinement of elements and more consistency in reading for pace comparison. Many of the advantages of taking specialized time studies with recorder 30 are of an intangible nature, such as better human relations between management and labor due to the factual and unbiased nature of the time study data which may be obtained through the method and apparatus of the invention. When emphasis must be on accuracy of recordings and refinement of elemental divisions, particularly for short cycle operations, the instruments and method of the present invention provides a new realm of finer measurement. The lightweight and compact arrangement of recorder 30, coupled with a simple but effective method of suspending the same from the observer, allow the observer to lean, stretch and bend to watch every movement of the worker and his machine. Since the observer is not required to glance at a stop watch or write notes for every element, very little will escape his eye, and all will be recorded with an accuracy that a stop watch cannot approach. The pace simulator 93 allows the observer to follow a worker's repetitive movements and provides an accurate time measurement for pace comparison that eliminates guess work hitherto involved in establishing the worker's pace where repetitive motion equals accomplishment.

The two row arrangement of the sequentially numbered push buttons 54 at the upper left hand corner of case 32 facilitates operation of the keys with the fingers of the left hand of the operator and permits development of a fast and accurate recording technique with a minimum of training. Similarly, the location of the pace simulator 93 at the right hand side of the case places it within convenient reach for operation by the right hand of the operator. Tracking the worker's tempo with a swinging pointer 95 against fixed stops has also been found to be a readily learned technique since all that is required is for the observer to turn the knob so that the pointer moves back and forth in unison with the worker's movements. This is not as difficult as might be imagined by those unfamiliar with motion study. Workers invariably fall into a rhythmic motion pattern, regardless of differences in the "reaches" involved, and this rhythm is easily sensed by an observer who is familiar with the operation. Thus, the apparatus of the invention permits simultaneous measurement and recording of the time involved in each sequential element in a particular task, and measurement and recording of the tempo at which it is being performed for subsequent normalization.

Presently, most companies will not accept a stop watch time study where the observer rates the worker's performance beyond 15% above or below the normal pace. Accuracy is too questionable under these conditions. However, with the pace simulation method and device of the invention, there are no limits to the pace that can be measured and compared with the established normal concept.

The time study data is recorded on a convenient and permanent circular chart which cannot be readily erased or otherwise altered, thereby lending increased authenticity to time and motion studies in the eyes of both labor and management. When the recording is completed, the chart is readily removed and quickly replaced by a fresh chart, if the study is still in progress. The completed chart with the recorded data is readily adaptable to be read off by placing the same in a read off device as disclosed in our copending application filed concurrently herewith. Because of the extreme accuracy provided by the push button input and electrostatic discharge from the styli, readings can be carried out to four decimal places or to the nearest ten-thousandth of a minute, instead of the conventional practice of recording stop watch observations to only two decimal places.

Time study data obtained by recorder 30 can be collected over a period of time in a given company and eventually compiled into a collection of standard data which will be much more accurate than standard data built from the results of stop watch time studies, as well as giving a complete breakdown of job elements often not possible with the stop watch method. The final results of data built from studies taken with recorder 30 should provide improved labor and management relations because of the reduction of most of the errors inherent in reading a stop watch and the elimination of human judgment in measurement of tempo and calculation of normalization based thereon.

We claim:

1. Apparatus for recording time study data comprising a support, carrying means mounted on said support and adapted to receive a record thereon for movement relative to said support, means for moving said carrying means at a predetermined speed in a predetermined direction relative to said support, means including a recording head adapted to record indicia on the record while traveling at a predetermined speed transverse to said predetermined direction and means for actuating said recording means to thereby record indicia on said record indicative of the time relationship of events occurrring in a time study, said actuating means comprising a plurality of selectively manually actuatable means individually coded to the various job elements under study, said recording head including plural marking means disposed for recording indicia on the record in a plurality of channels spaced transversely of the direction of movement of the record and arranged one for each of said plurality of actuatable means, each of said selectively actuatable means being operatively electrically connected to an associated one of said plural marking means of said recording head such that selective actuation of any one of said pluraliy of actuatable means and simultaneous actuation of any two or more of said actuatable means causes the corresponding plural means to record indicia on the record in each channel corresponding to the actuated means.

2. The combination set forth in claim 1 wherein said selectively actuated means comprises a plurality of push buttons arranged in a keyboard layout on said support and individually coded to the job elements being time studied.

3. The combination set forth in claim 2 wherein said recording head has a plurality of electrically conductive styli mounted thereon having terminal ends disposed closely adjacent said carrying means and arranged in a row spaced from one another, and electrodischarge means operably coupled between said actuating means and said styli for causing a recording current to flow between one of said styli and said carrying means in response to selective actuation of the corresponding one of said selectively actuatable means.

4. Apparatus for recording time study data comprising a support, carrying means mounted on said support and adapted to receive a record thereon for movement relative to said support, means for moving said carrying means at a predetermined speed in a predetermined direction relative to said support, means including a recording head adapted to record indicia on the record while traveling at a predetermined speed transverse to said predetermined direction and means for actuating said recording means to thereby record indicia on said record indicative of the time relationship of events occurring in a time study, said actuating means comprising a pace simulator having a member movable through a fixed arc corresponding to the end limits of an observable movement of a worker, means actuated by movement of said member at predetermined points in the movement thereof between said end limits, and means operably connecting said last mentioned means to said recording head to cause the same to record indicia on the record as said member sweeps past said points in its travel to thereby indicate the time span of an intermediate portion of said movement.

5. The combination set forth in claim 4 wherein said pace simulator member comprises a spindle rotatably mounted on said support, a knob mounted on said spindle for rotating the spindle, a pointer being connected to said knob for swinging movement in response to rotation of said knob, said movement actuated means comprising first and second switch contact means mounted for actuation by rotation of said spindle at predetermined angularly spaced points in the arc of movement of said pointer, and stop means mounted in fixed positions on said support to limit the movement of the pointer to said fixed arc.

6. The combination set forth in claim 5 wherein said switch contact means comprises a pair of contact members, adjustable mounting means for said contact members secured to one end of said spindle for adjustably securing said contact members to said spindle in angularly spaced positions, a wiper contact mounted in fixed position relative to said support adjacent the path of travel of said contact members and adapted to make contact therewith and an electrical circuit including said contact members and said wiper contact operably connected to said recording head for actuating the recording head when either of said contact members contacts said wiper.

7. Apparatus for recording time study data comprising a support, carrying means mounted on said support and adapted to receive a record thereon for movement relative to said support, means for moving said carrying means at a predetermined speed in a predetermined direction relative to said support, means including a recording head adapted to record indicia on the record while traveling at a predetermined speed transverse to said predetermined direction and means for actuating said recording means to thereby record indicia on said record indicative of the time relationship of events occurring in a time study, said actuating means comprising a plurality of selectively manually actuatable means adapted to be individually coded to the various job elements under study, said recording head including plural marking means for recording indicia on the record in a plurality of channels spaced transversely of the direction of movement of the record and arranged one for each of said plurality of actuatable means, said selectively actuatable means being operatively connected to said recording head such that selective actuation of any one of said plurality of actuatable means causes the corresponding one of said plural recording means to record indicia on the record in the channel corresponding to the actuated means, said recording means comprising an arm mounted on said support having a lead screw disposed adjacent and extending parallel to the record receiving surface of said carrying means, means for rotating said lead screw at a predetermined speed correlated with the speed of said carrying means, and threaded means on said recording head threadably engaging said lead screw for propelling said head at a predetermined speed transversely of the direction of movement of said carrying means, said arm including a guide rod extending parallel to said lead screw, said head being mounted on said guide rod for sliding movement parallel to said lead screw and for pivotal movement about the axis of said guide rod, said threaded means of said head comprising a half nut adapted to rest on the side of said lead screw remote from said carrying means and means for yieldably biasing said half nut into threadable driven engagement with said lead screw.

8. The combination set forth in claim 7 further including stop means at one end of said lead screw having a first camming surface disposed in the path of movement of said head, said head having a second camming surface adapted to engage said first camming surface when head reaches said stop means, said camming surfaces being adapted to pivot said head against the pressure of said biasing means in response to relative axial movement between said camming surfaces to thereby disengage said half nut from said lead screw.

9. Apparatus for recording time study data comprising a support, carrying means mounted on said support and adapted to receive a record thereon for movement relative to said support, means for moving said carrying means at a predetermined speed in a predetermined direction relative to said support, means including a recording head adapted to record indicia on the record while traveling at a predetermined speed transverse to said predetermined direction and means for actuating said recording means to thereby record indicia on said record indicative of the time relationship of events occurring in a time study, said actuating means comprising a plurality of selectively manually actuatable means adapted to be individually coded to the various job elements under study, said recording head including means for recording indicia on the record in a plurality of channels spaced transversely of the direction of movement of the record and arranged one for each of said plurality of actuatable means, said selectively actuatable means being operatively connected to said recording head such that selective actuation of any one of said plurality of actuatable means causes the corresponding one of said plural recording means to record indicia on the record in the channel corresponding to the actuated means, said recording means comprising an arm mounted on said support having a lead screw disposed adjacent and extending parallel to the record receiving surface of said carrying means, means for rotating said lead screw at a predetermined speed correlated with the speed of said carrying means, and threaded means on said recording head threadably engaging said lead screw for propelling said head at a predetermined speed transversely of the direction of movement of said carrying means, said carrying means comprising a turntable rotatably mounted on said support adapted to receive a circular disc thereon as the record, said moving means being adapted to rotatably drive said turntable for rotation about its axis, said recording means being adapted to cause said recording head to move radially of said turntable, and further including means for mounting said arm at one end thereof on said support for swinging movement about an axis spaced radially outwardly beyond said turntable and for pivotal movement in a plane perpendicular to said turntable, said arm at the end thereof opposite said one end having magnetic clamping means rotatably mounted thereon adapted to register with the center of said turntable in the recording position of said arm, said turntable being constructed such that said clamping means is magnetically attracted toward said turntable for clamping a record therebetween, and a release member mounted concentrically with said clamping means and movable relative to said arm for engaging the turntable to assist in releasing said clamping means therefrom.

10. A portable events recording machine comprising a housing containing a turntable adapted to receive a circular electro-sensitive chart thereon for coaxial rotation therewith, drive means for rotating said turntable about its axis at a predetermined speed, a recording arm adapted to extend over said turntable generally radially thereof and parallel to the surface thereof, a recording head movably mounted on said recording arm for travel therealong, means for moving said head along said arm at a given speed, electro-discharge circuit means including battery means, capacitor means chargeable by said battery means and means for discharging said capacitor means comprising a plurality of styli mounted on said head in a predetermined spaced arrangement and plural actuating means operably coupled between said capacitor means and said styli for selectively generating an electro-static capacitive discharge between one or more of said styli and the chart on said turntable.

11. A portable events recording machine comprising housing containing a turntable adapted to receive a circular electro-sensitive chart thereon for coaxial rotation therewith, drive means for rotating said turntable about its axis at a predetermined speed, a recording arm adapted to extend over said turntable generally radially thereof and parallel to the surface thereof, a recording head movably mounted on said recording arm for travel therealong, means for moving said head along said arm at a given speed, electro-discharge means including a plurality of styli mounted on said head in a predetermined spaced arrangement and plural actuating means coupled to said styli for selectively generating an electro-static discharge between a selected one of said styli and the chart on said turntable, said electro-discharge means comprising a source of direct current potential, capacitance means, circuit means operably connected to said plural actuating means and operable for alternately connecting said capacitance means across said source for charging said capacitance means and for disconnecting said capacitance means from said source and discharging said capacitance means, said circuit means being adapted to couple said capacitance means to a selected stylus associated with a corresponding one of said plural actuating means when the latter is actuated to thereby cause a recording current between said selected stylus and the chart on said turntable.

12. The combination set forth in claim 11 wherein said capacitance means comprises a plurality of capacitors, one for each of said styli, said circuit means including a discharge loop for each of said capacitors normally closed in the unactuated condition of said plural actuating means, said circuit means including a charging circuit for each of said capacitors connectable by an associated one of said plural actuating means to said source and including an associated stylus and said turntable, said charging circuit for each capacitor being closeable and said discharge circuit for each capacitor being openable in response to actuation of the associated one of said plural actuating means to generate the spark discharge by connection across said source of the selected uncharged capacitor.

13. The combination set forth in claim 12 including a row of lights mounted on said housing and arranged to indicate by illumination thereof an associated one of said plural actuating means, and light control circuit means adapted to render any one of said lights luminous in response to actuation of the one of said plural actuating means associated with said one light, said circuit means being adapted to maintain said one light luminous until actuation of any of the remaining plural actuating means and thereupon extinguishing said one light.

14. The combination set forth in claim 13 wherein said light control circuit means comprises a plurality of silicon controlled rectifiers series connected one to each of said lights, a normally closed supply circuit for connecting each light and associated rectifier across said source including a plurality of series interconnected first switches one operated by actuation of each of said plural actuating means to open said supply circuit, a trigger circuit for causing conduction of each one of said rectifiers including a capacitor connected between one side of said source and a gating electrode of said one rectifier, and a charging circuit for each one of said capacitors adapted to connect said one capacitor across said source for charging said one capacitor when the associated plural actuating means is actuated and adapted to be disconnected from said one capacitor when said associated plural actuating means is deactuated whereupon said one capacitor supplies firing potential via said trigger circuit to said rectifier whereby said rectifier is turned on to energize the associated light when said associated plural actuating means is actuated and said light is thereafter maintained energized by closure of said supply circuit upon deactuation of said associated plural actuating means.

15. The combination set forth in claim 11 further including pace simulating circuit means including a pair of contacts and cooperating circuit means adapted to sequentially apply sparking potential to one of said styli of said head in response to movement of said contacts through a fixed path simulative of a repetitive motion of a worker.

16. The combination set forth in claim 11 wherein said circuit means includes a plurality of series interconnected first switch means, one for each stylus adapted to be actuated individually by an associated one of said plural actuating means, a pulse transformer having a primary coil and a secondary coil, said first switch means being adapted to connect said secondary coil to a selected stylus via the one of said first switch means actuated by a corresponding one of said plural actuating means via the first switch means between said one first switch means and said secondary coil, second switch means for connecting said primary coil across said capacitance means for discharging the same through said primary coil whenever one of said plural actuating means is actuated, and third switch means adapted to connect said capacitance means to said source for charging in the unactuated condition of said plural actuating means.

17. The combination set forth in claim 16 including a relay having a coil and means connecting said relay coil across said source via said first switch means and secondary coil when all of said plural actuating means are in their unactuated condition to thereby energize said relay coil, said second and third switch means comprising contact means controlled by said relay coil and adapted to connect said capacitance means across said source for charging the same in response to energization of said relay coil and to connect said primary coil across the charged capacitance means in response to deenergization of the relay coil to thereby pulse the secondary of said transformer, said first switch means being adapted to deenergize said relay coil when any one of said first switch means is actuated by actuation of the corresponding plural actuating means.

18. A portable events recording machine comprising a housing containing a turntable adapted to receive a circular electro-sensitive chart thereon for coaxial rotation therewith, drive means for rotating said turntable about its axis at a predetermined speed, a recording arm adapted to extend over said turntable generally radially thereof and parallel to the surface thereof, a recording head movably mounted on said head along said arm at a given speed, electro-discharge means including a plurality of styli mounted on said head in a predetermined spaced arrangement and plural actuating means coupled to said styli for selectively generating an electrostatic discharge between a selected one of said styli and the chart on said turntable, said housing having top and bottom walls interconnected by a pair of side walls and front and rear walls, said top wall having an opening therein closed by a lid hinged along one edge to said top wall whereby said lid may be pivoted upwardly to permit access to said turntable, said plural actuating means comprising a plurality of keys arranged in a keyboard disposed in one corner of said housing adjacent the intersection of said front wall and one side wall thereof, a row of lamps disposed in said top wall along one side of said lid, means for energizing one of said lamps when a corresponding one of said keys is actuated and means for locating a job analysis sheet with one side thereof adjacent said row of lamps.

19. The combination set forth in claim 18 further including a pace simulator mounted on said lid adjacent the side thereof remote from said lamps and keyboard, said pace simulator comprising a pointer mounted at one end for rotation about an axis perpendicular to said lid, a pair of stops mounted on said lid for limiting the swinging movement of said pointer to a fixed arc, and switch means actuated in response to movement of said pointer past intermediate points in the travel thereof between said end stops, said switch means each being operably connected via said electro-discharge means to one of said styli for generating a spark discharge when the pointer traverses each of said points in its fixed arc of travel.

20. The combination set forth in claim 18 wherein said rear wall of said housing is curved inwardly toward said front wall to conform to the waist of an operator, and including support means mounted on said rear wall for attaching said housing to the waist belt of an observer and a U-strap connected at its ends to the opposite side walls of said housing near the front wall thereof, said support means and strap being adapted to suspend said housing in a generally horizontal position extending outwardly from the waist of the observer when said strap is passed around the back of the neck of the observer.

21. Apparatus for making a pace comparison measurement comprising:

(1) a support, (2) pointer means mounted on said support for back and forth movement through a given path, said pointer means having a sighting portion aimable at a worker to track a repetitive motion of the worker, (3) abutment means mounted on said support defining fixed end limits of said given path and engageable with said pointer means for limiting the total movement of said sighting portion to within said given path, (4) means for manually manipulating said pointer means to aim said sighting portion at the worker and thereby manually synchronize the movement of said pointer means between said end limits with the repetitive motion of the worker between the end limits of the worker motion, (5) a recording device having a recording medium driven at a constant speed, (6) first and second recording indicia generating means each having pointer sensing means positioned on said support at predetermined spaced points along said given path of said pointer means and between said end limits thereof, and (7) means operably connecting said first and second indicia generating means to said recording device such that movement of said pointer means past said first and second sensing means respectively generates first and second indicia on said recording medium of said recording device to thereby record an intermediate time span of the worker motion indicative of the tempo of performance of the worker.

22. The apparatus as set forth in claim 21 wherein said pointer means is mounted on said support for pivotal movement about an axis, wherein said sighting portion of said pointer comprises a free end thereof spaced from the pivotal axis of said pointer for movement in an arc through said given path, and wherein said means for manually manipulating said pointer means comprises a knob connected to said pointer means and rotatable about the pivotal axis of said pointer means.

23. A method of making a pace comparison measurement for comparing actual observed times taken in a time study with normalized time study data comprising the steps of:

(1) observing the limb motion of a worker while the worker is performing a repetitive task, (2) manually manipulating a movable member such that the member tracks the repetitive limb motion of the worker, (3) positively limiting the total movement of the member to a fixed path by manipulating the member between fixed abutments defining the end limits of said fixed path, (4) manually synchronizing the movement of the member with the limb motion by moving the tracking member against the end limit abutments corresponding to, and coincidental with, the start and finish of the worker limb motion, and (5) sensing the rate of movement of the limb motion by moving the member past first and second sensing means located at predetermined points within the path of travel of the member and adapted to actuate a timing device in response to movement of the member therepast to thereby extract a time measurement of an intermediate portion of the member movement indicative of the tempo of performance of the worker.

References Cited

UNITED STATES PATENTS

| | | | |
|---|---|---|---|
| 1,128,557 | 2/1915 | Del Valle | 58—39.5 X |
| 1,875,653 | 9/1932 | Post | 346—117 |
| 2,210,380 | 8/1940 | Potter | 346—37 X |
| 792,680 | 6/1905 | Taylor et al. | 346—81 X |
| 916,572 | 3/1909 | Mettegang | 346—74 |
| 1,069,594 | 8/1913 | Wurmb et al. | 346—137 |
| 1,405,060 | 1/1922 | Mosley | 346—25 |
| 2,278,113 | 3/1942 | Moreau | 324—157 |
| 2,684,280 | 7/1954 | Opocensky et al. | 346—137 X |
| 2,733,116 | 1/1956 | Fantham et al. | 346—7 |
| 2,888,311 | 5/1959 | Gaebler | 346—20 X |

RICHARD B. WILKINSON, *Primary Examiner.*

JOSEPH W. HARTARY, *Assistant Examiner.*

U.S. Cl. X.R.

346—17, 74, 102, 137, 145; 340—266